(12) United States Patent
Imoto

(10) Patent No.: US 7,949,523 B2
(45) Date of Patent: May 24, 2011

(54) APPARATUS, METHOD, AND COMPUTER PROGRAM PRODUCT FOR PROCESSING VOICE IN SPEECH

(75) Inventor: Kazunori Imoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1105 days.

(21) Appl. No.: 11/685,907

(22) Filed: Mar. 14, 2007

(65) Prior Publication Data

US 2007/0225975 A1    Sep. 27, 2007

(30) Foreign Application Priority Data

Mar. 27, 2006  (JP) ................................ 2006-086513

(51) Int. Cl.
*G01L 21/00* (2006.01)
*G01L 21/02* (2006.01)
*G01L 15/00* (2006.01)

(52) U.S. Cl. ...................... 704/228; 704/226; 704/231

(58) Field of Classification Search ................ 704/2, 228
See application file for complete search history.

(56) References Cited

U.S. PATENT DOCUMENTS

| | | | | |
|---|---|---|---|---|
| 5,623,609 | A * | 4/1997 | Kaye et al. ........................ | 704/1 |
| 5,960,113 | A * | 9/1999 | Even et al. ..................... | 382/229 |
| 7,319,960 | B2 * | 1/2008 | Riis et al. ................... | 704/256.4 |
| 7,567,676 | B2 * | 7/2009 | Griesinger ...................... | 381/56 |
| 2003/0033266 | A1 * | 2/2003 | Schott et al. .................... | 706/45 |
| 2003/0212546 | A1 * | 11/2003 | Shaw ............................... | 704/9 |
| 2006/0122834 | A1 * | 6/2006 | Bennett .......................... | 704/256 |
| 2006/0122837 | A1 * | 6/2006 | Kim et al. .................. | 704/270.1 |
| 2006/0224616 | A1 | 10/2006 | Imoto et al. | |

FOREIGN PATENT DOCUMENTS

| | | |
|---|---|---|
| JP | 2003-29779 | 1/2003 |
| JP | 2003-330491 | 11/2003 |
| JP | 2004-109563 | 4/2004 |
| JP | 2004-325635 | 11/2004 |

OTHER PUBLICATIONS

Neri et al. 'Automatic Speech Recognition for second language learning: How and why it actually works, Proceedings of the 15th ICPhS, Barcelona, Spain, pp. 1157-1160 (2003).*
Robert E. Frederking, et al., "Field Testing the Tongues Speech-to-Speech Machine Translation System", Proceedings of the Third International Conference on Language Resources and Evaluation, Las Palmas, May 2002, pp. 160-164.

* cited by examiner

*Primary Examiner* — Justin W Rider
(74) *Attorney, Agent, or Firm* — Oblon, Spivak, McClelland, Maier & Neustadt, L.L.P.

(57) ABSTRACT

A speech processing apparatus includes a rule storing unit that stores therein a rule that correlates one another causes of errors in speech recognition, responding methods each of which is used when an error has occurred during the speech recognition, and responding users each of whom is one of a plurality of users and serving as a target of a response; a detecting unit that detects a cause of an error that has occurred during the recognition of the speech; a method selecting unit that selects one of the responding methods that is correlated with the detected cause of the error from the rule storing unit; a user selecting unit that selects one of the responding users that is correlated with the detected cause of the error from the rule storing unit; and an executing unit that executes the response by the selected responding method to the selected responding user.

17 Claims, 21 Drawing Sheets

| TYPES OF CAUSES | DETECTED CAUSE OF ERROR | RESPONDING USER | RESPONSE EXAMPLE |
|---|---|---|---|
| RATE OF SPEECH | RATE OF ENTIRE VOICE IS HIGH (LOW) | SPEAKER | PLEASE SPEAK MORE SLOWLY (FASTER). |
| | RATE OF PORTION OF VOICE IS HIGH (LOW) | SPEAKER | PLEASE SPEAK MORE SLOWLY (FASTER) AT THE END. |
| SOUND VOLUME OF VOICE | SOUND VOLUME OF ENTIRE VOICE IS LARGE (SMALL) | OWNER | PLEASE ADJUST THE SOUND VOLUME. |
| | SOUND VOLUME OF PORTION OF VOICE IS LARGE (SMALL) | SPEAKER | THE LAST PORTION OF THE VOICE WAS NOT UNDERSTOOD BECAUSE THE SOUND VOLUME WAS TOO SMALL (LARGE). PLEASE SPEAK MORE LOUDLY (SOFTLY). |
| NOISE | BACKGROUND NOISE IS OVERLAPPING ENTIRE SPEECH | OWNER | YOUR VOICE WAS NOT UNDERSTOOD BECAUSE OF THE NOISE IN THE SURROUNDINGS. PLEASE CHANGE THE LOCATION AND TRY AGAIN. |
| | SUDDEN NOISE IS OVERLAPPING PORTION OF VOICE | SPEAKER | A PORTION OF YOUR VOICE WAS NOT UNDERSTOOD. PLEASE SPEAK AGAIN. |

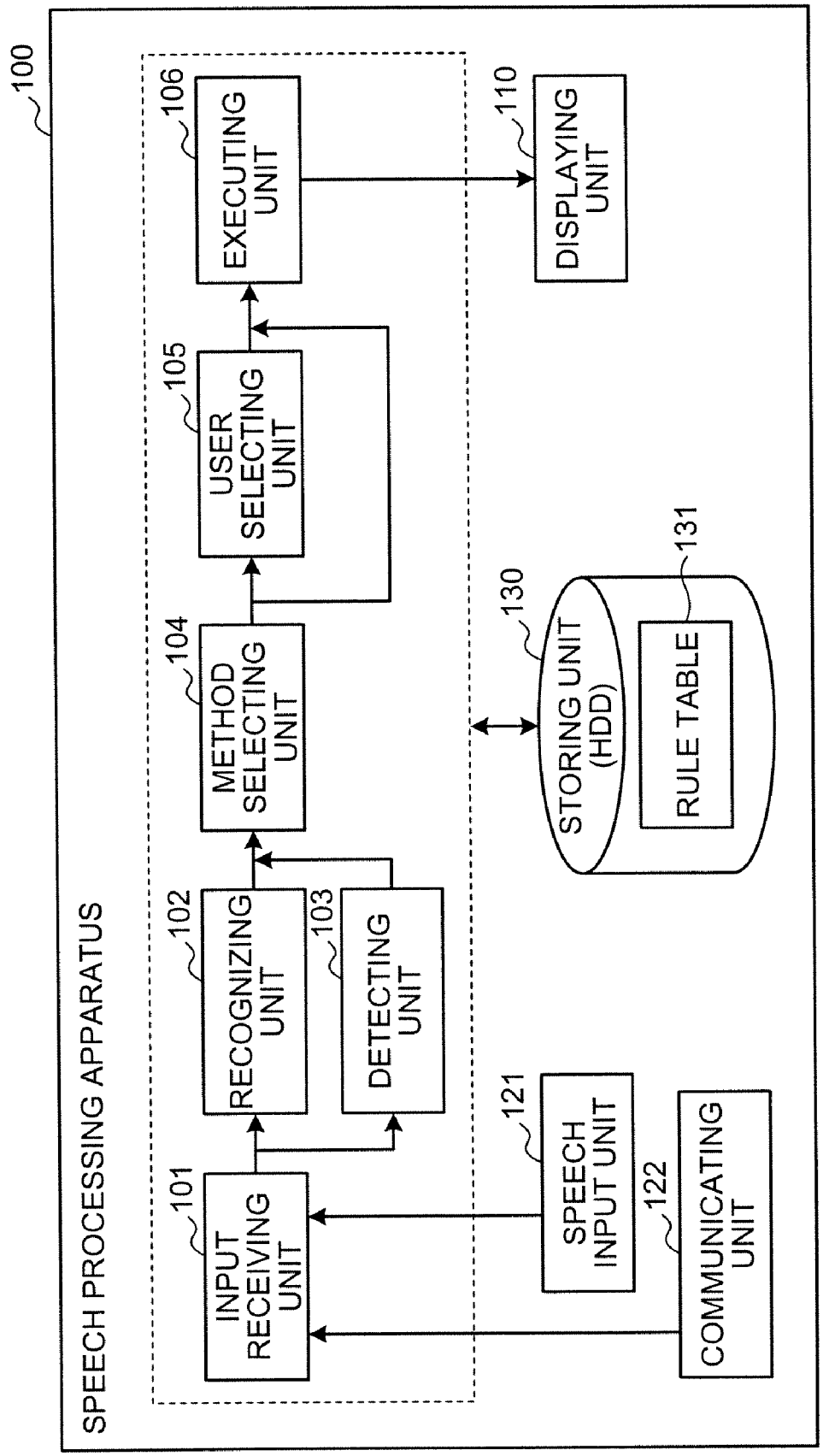

FIG.2

| TYPES OF CAUSES | DETECTED CAUSE OF ERROR | RESPONDING USER | RESPONSE EXAMPLE |
|---|---|---|---|
| RATE OF SPEECH | RATE OF ENTIRE VOICE IS HIGH (LOW) | SPEAKER | PLEASE SPEAK MORE SLOWLY (FASTER). |
| | RATE OF PORTION OF VOICE IS HIGH (LOW) | SPEAKER | PLEASE SPEAK MORE SLOWLY (FASTER) AT THE END. |
| SOUND VOLUME OF VOICE | SOUND VOLUME OF ENTIRE VOICE IS LARGE (SMALL) | OWNER | PLEASE ADJUST THE SOUND VOLUME. |
| | SOUND VOLUME OF PORTION OF VOICE IS LARGE (SMALL) | SPEAKER | THE LAST PORTION OF THE VOICE WAS NOT UNDERSTOOD BECAUSE THE SOUND VOLUME WAS TOO SMALL (LARGE). PLEASE SPEAK MORE LOUDLY (SOFTLY). |
| NOISE | BACKGROUND NOISE IS OVERLAPPING ENTIRE SPEECH | OWNER | YOUR VOICE WAS NOT UNDERSTOOD BECAUSE OF THE NOISE IN THE SURROUNDINGS. PLEASE CHANGE THE LOCATION AND TRY AGAIN. |
| | SUDDEN NOISE IS OVERLAPPING PORTION OF VOICE | SPEAKER | A PORTION OF YOUR VOICE WAS NOT UNDERSTOOD. PLEASE SPEAK AGAIN. |

FIG.21

| TIME OF VOICE | SPEAKER | DETECTED CAUSE OF ERROR |
|---|---|---|
| IMMEDIATELY PRECEDING VOICE | ENGLISH SPEAKER | BACKGROUND NOISE |
| SECOND LAST VOICE | JAPANESE SPEAKER | — |
| THIRD LAST VOICE | ENGLISH SPEAKER | — |
| FOURTH LAST VOICE | ENGLISH SPEAKER | RATE OF VOICE IS HIGH |

| TYPE OF CAUSE | DETECTED CAUSE OF ERROR | HISTORY CONDITIONS | RESPONDING USER | RESPONSE EXAMPLE |
|---|---|---|---|---|
| NOISE | BACKGROUND NOISE IS OVERLAPPING ENTIRE VOICE | BACKGROUND NOISE WAS OVERLAPPING IMMEDIATELY PRECEDING VOICE | OWNER | YOUR SPEECH WAS NOT UNDERSTOOD BECAUSE OF THE NOISE IN THE SURROUNDINGS. PLEASE CHANGE THE LOCATION AND TRY AGAIN. |
| | | NO BACKGROUND NOISE WAS OVERLAPPING IMMEDIATELY PRECEDING VOICE | SPEAKER | PLEASE SPEAK MORE LOUDLY. |

2031

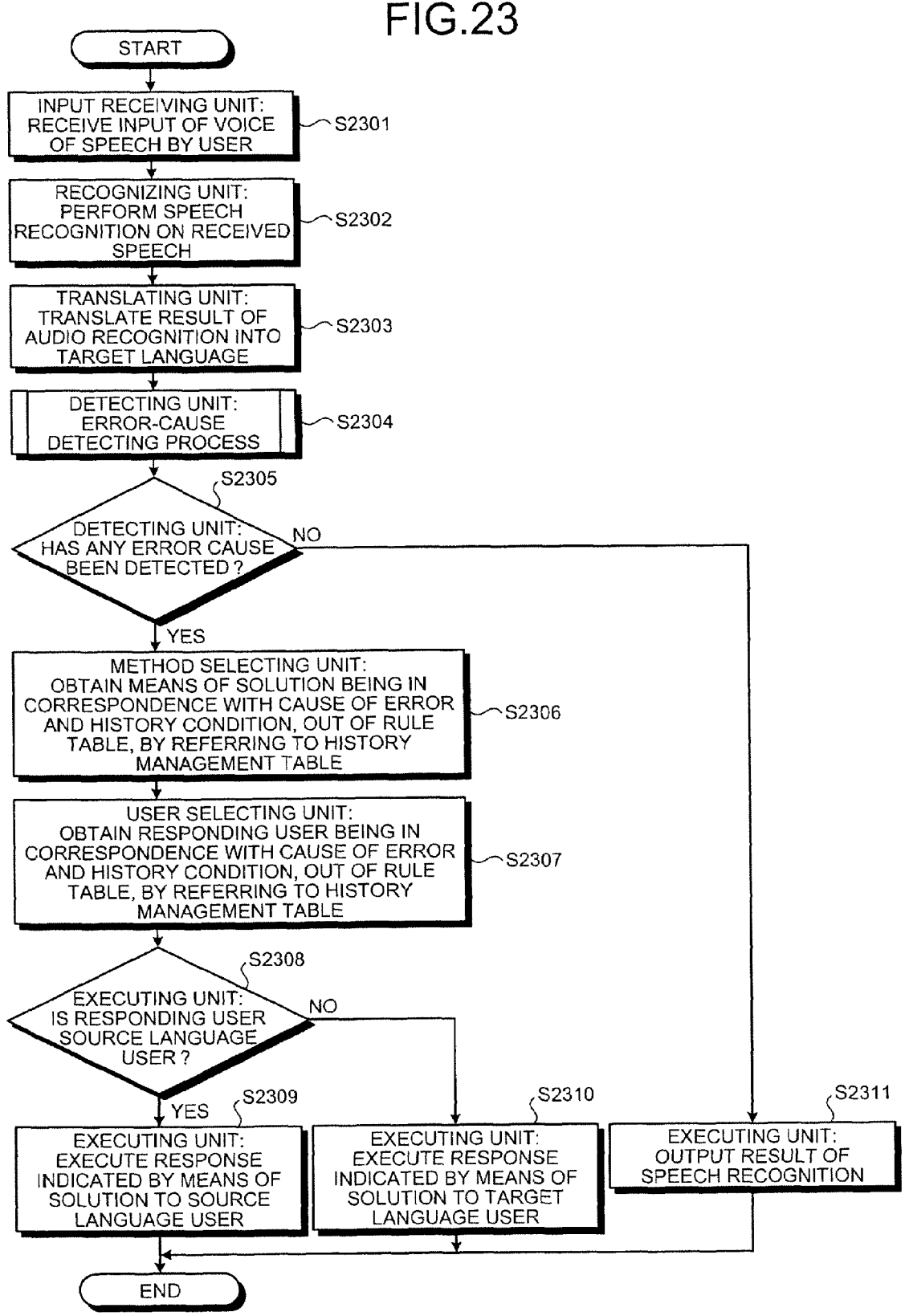

APPARATUS, METHOD, AND COMPUTER PROGRAM PRODUCT FOR PROCESSING VOICE IN SPEECH

CROSS-REFERENCE TO RELATED APPLICATIONS

This application is based upon and claims the benefit of priority from the prior Japanese Patent Application No. 2006-86513, filed on Mar. 27, 2006; the entire contents of which are incorporated herein by reference.

BACKGROUND OF THE INVENTION

1. Field of the Invention

The present invention relates to an apparatus, a method, and a computer program product for processing voice in speech and supporting communication among people.

2. Description of the Related Art

In recent years, many studies have been made on speech processing techniques including speech recognition and speech synthesis and on language processing techniques including machine translation. Also, many studies have been made on speech language processing techniques including speech translation in which speech processing is combined with language processing. A large number of problems need to be solved before speech translation is put into use in actuality; however, people have high expectations for speech translation techniques as techniques that support communication between people who speak mutually different languages. There are some products that have already been put into practical use by solving technical problems with an arrangement to appropriately limit the range of situations for use or to have the user involved in cooperation.

The levels of performance in speech translation techniques are expected to be higher in the future; however, it is not easy to achieve the ultimate goal of "having speech of both speakers translated correctly at all times in all situations". As an example, as for speech recognition, which is a part of speech translation techniques, it is not easy to make it possible to consistently recognize the contents of the speech of the users in every environment of use.

In the current technological situation, there is no guarantee that it is possible to always obtain a correct translation result. Thus, to have a speech translation technique that is at a practical-use level, it is important to be able to correct errors efficiently, even when a translation result has an error, and therefore the contents of the speech uttered by the conversation partner is not understandable.

As we take a look at communication among people, when one cannot hear what the other person is saying because it is noisy around them, or when one cannot understand some of the words the other person has said, the errors will be corrected and supplemented through interactions between them. For example, one will ask the other person to speak one more time, or one will check the meaning of a word with the other person. Accordingly, to raise the levels of speech translation techniques to a practical-use level, it is important not only to improve the level of performance in various technical fields that are involved in the speech translation technique, but also to incorporate an interface that is used for correcting errors efficiently, into the system.

When one cannot understand the contents of speech uttered by the other party, one of the simplest ways to correct the error is to ask the speaker to repeat the speech. This is the most reliable method to inform the speaker that the listener did not understand, regardless of the type of the error that has occurred during a speech translation process.

When this method is used, even if the listener has understood some part of the speech, the speaker will be asked to repeat the contents of the entire speech. Thus, the level of efficiency is low. In addition, it is not possible to inform the speaker of the reason why the speech was not translated correctly. Thus, even if the speaker repeats the speech, the same error may be repeated. As a result, there is risk that the conversation may end up in failure.

To cope with this problem, another technique with which the listener is asked to select a portion of a translation result that he/she could not understand has been proposed. Also, another technique with which options of reasons why the listener did not understand the translation result are presented so that the listener can select a reason from the options has been proposed.

According to these techniques, the listener is able to point out only the part that he/she could not understand, instead of the entire speech. Thus, the speaker is able to correct the error by speaking only the part that has been pointed out. Thus, it is possible to keep having a conversation efficiently. In addition, it is possible to allow the listener to select the reason why he/she could not understand, within a range of possible predictions. Thus, it is possible to reduce the possibility of repeating the same error.

However, there is a wide range of reasons why a result of translation cannot be understood. The listener is able to point out only a small portion of the wide range of reasons. To be more specific, the reasons why a translation result cannot be understood may be broadly classified into a group of reasons originating in the speaker or the listener and a group of reasons originating in errors related to the techniques. Examples of the former group include a situation where the contents of speech have been correctly translated, but the listener has inadequate knowledge to understand it, and a situation where the speech itself contains an error. Examples of the latter group include reasons caused by errors related to the technical fields that are involved in the speech translation technique, such as speech recognition and machine translation.

As for the latter group, the reasons related to machine translation can be further classified into errors related to interpretation of words having multiple meanings and errors in syntax analysis. The reasons related to speech recognition can be further classified into linguistic errors like unknown words and acoustic errors like manners of speaking (e.g. the rate of speech, the sound volume of the voice, etc.) and the usage environment (whether there is noise).

Of these various causes of errors, it is difficult for the listener to point out, for example, a problem in the manner of speaking of the speaker, because the listener does not understand the speaker's language. Accordingly, the listener is able to point out only a small portion of the wide range of causes of errors, such as lack of knowledge of the listener himself/herself or errors in interpretations of words having multiple meanings. Especially, when the problem is related to an acoustic error in the speech recognition process, because it is difficult also for the speaker to notice the error, there is a high risk that the same error can be repeated.

To cope with this situation, a technique with which the cause (e.g. the sound volume of the speech or the surrounding environment) that affects the performance level in speech recognition is detected, and the detected cause is presented to the speaker as feedback has been proposed. (For example, see JP-A 2003-330491 (KOKAI)). As disclosed in JP-A 2003-330491 (KOKAI), in the example of a conversation between a machine, as represented by a robot, and a person, the following conditions are satisfied: the conversation takes place on unequal terms between the machine and the person, the speaker speaking to the machine is usually only one person, and the speaker is also the user of the machine. Thus, feedback given to the speaker works effectively both in the short term and the long term.

However, unlike a technique that is designed to support conversations among people, the method disclosed in JP-A 2003-330491 (KOKAI) is not prepared to accommodate a situation where the device is operated by a plurality of users including a person who does not own the device. Thus, because the feedback is returned to the speaker in a uniform manner, there are some situations where it is not possible to correct errors properly.

For example, when a person who is not an owner of the speech processing apparatus is the speaker, even if feedback instructing that the setting of the apparatus should be changed is returned to the speaker, it is not possible for the speaker to address to the problem, because he/she is not familiar with the operation of the apparatus.

This kind of problem is caused because people having conversations are basically on equal terms, when the speech recognition technique is used for supporting communication among people, in other words, when a person communicates with another person via a machine, and also because the premise that the speaker is also the owner of the device is not true.

SUMMARY OF THE INVENTION

According to one aspect of the present invention, a speech processing apparatus includes a rule storing unit that stores therein a rule that correlates one another causes of errors in speech recognition, responding methods each of which is used when an error has occurred during the speech recognition, and responding users each of whom is one of a plurality of users and serving as a target of a response; an input receiving unit that receives an input of a speech; a recognizing unit that recognizes the received speech; a detecting unit that detects a cause of an error that has occurred during the recognition of the speech; a method selecting unit that selects one of the responding methods that is correlated with the detected cause of the error from the rule storing unit; a user selecting unit that selects one of the responding users that is correlated with the detected cause of the error from the rule storing unit; and an executing unit that executes the response by the selected responding method to the selected responding user.

According to another aspect of the present invention, a speech processing method includes receiving an input of speech; recognizing the received speech; detecting a cause of an error that has occurred during the recognition of the speech; selecting one of responding methods that is correlated with the detected cause of the error from a rule storing unit that stores therein a rule, wherein the rule correlates causes of errors in speech recognition, responding methods each of which is used when an error has occurred during the speech recognition, and responding users each of whom is one of a plurality of users and serving as a target of a response; selecting one of the responding users that is correlated with the detected cause of the error from the rule storing unit; and executing the response by the selected responding method to the selected responding user.

A computer program product according to still another aspect of the present invention causes a computer to perform the method according to the present invention.

BRIEF DESCRIPTION OF THE DRAWINGS

FIG. 1 is a block diagram of a speech processing apparatus according to a first embodiment of the invention;

FIG. 2 is a drawing for explaining an example of a data structure of a rule table;

FIG. 21 is a drawing for explaining an example of a data structure of a history management table;

FIG. 22 is a drawing for explaining an example of a data structure of a rule table;

FIG. 23 is a flow chart of an overall procedure in a speech processing according to the fourth embodiment;

DETAILED DESCRIPTION OF THE INVENTION

Figure 3:
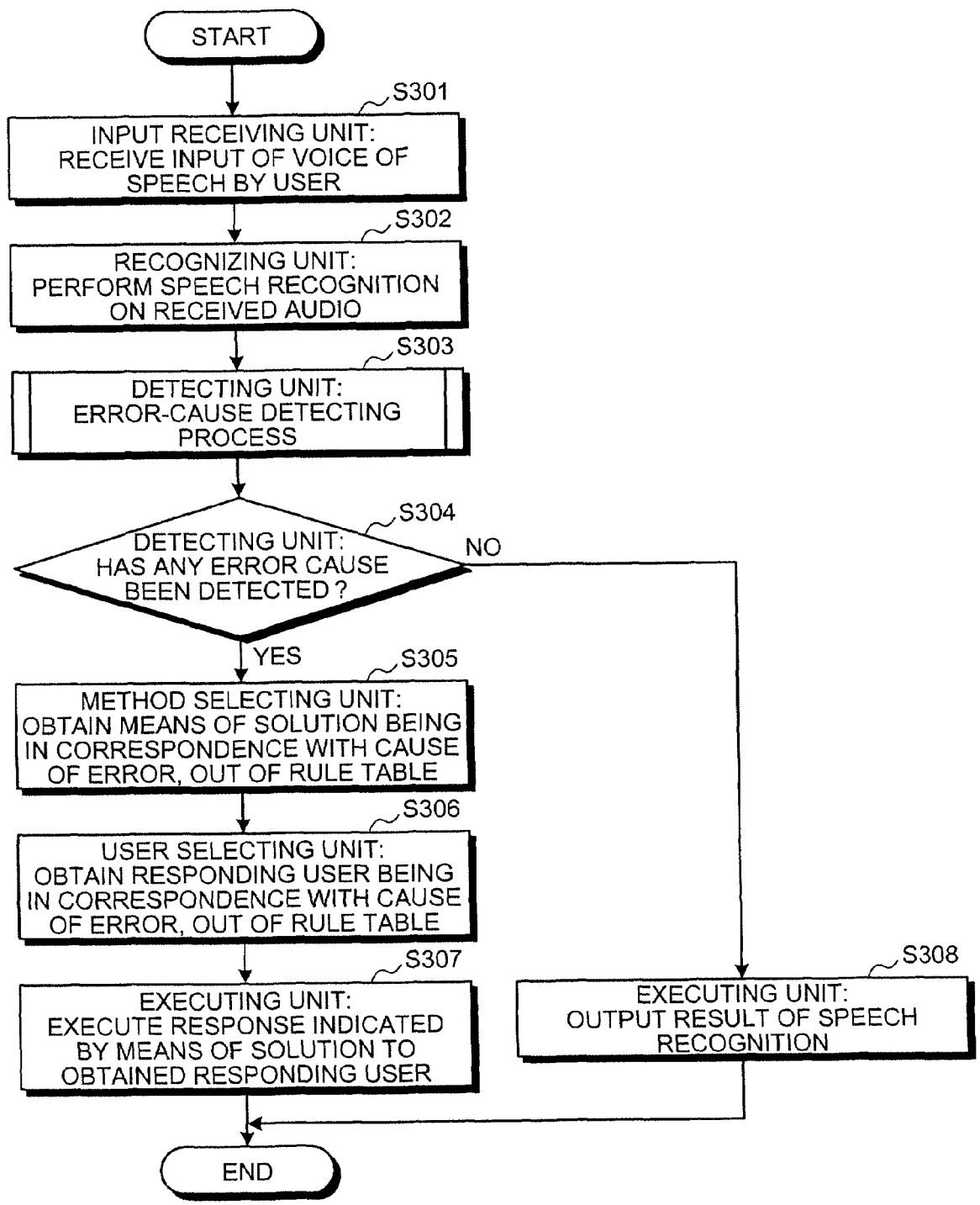
FIG. 3 is a flow chart of an overall procedure in a speech processing according to the first embodiment.

Exemplary embodiments of a speech processing apparatus, a speech processing method, and a speech processing program product will be explained in detail, with reference to the accompanying drawings.

A speech processing apparatus according to a first embodiment detects an acoustic cause of error in voice which is a speech processing target and switches responding users according to the contents of the cause of error.

FIG. 1 is a block diagram of a speech processing apparatus 100 according to the first embodiment. As shown in the drawing, the speech processing apparatus 100 includes an input receiving unit 101, a recognizing unit 102, a detecting unit 103, a method selecting unit 104, a user selecting unit 105, an executing unit 106, a displaying unit 110, a speech input unit 121, a communicating unit 122, and a storing unit 130.

The displaying unit 110 displays, on a display screen, a result of a speech processing, a message indicating a responding method to be used when a problem has occurred, or the like. An example of a display screen to be displayed on the displaying unit 110 will be explained later.

The speech input unit 121 converts a speech input into an electric signal (i.e. speech data), and outputs the speech data to the input receiving unit 101. The speech input unit 121 may be realized with a microphone that is generally used.

The communicating unit 122 receives speech data transmitted from an external apparatus (not shown) and outputs the received speech data to the input receiving unit 101. It is sufficient if the speech processing apparatus 100 includes at least one of the speech input unit 121 and the communicating unit 122, as the configuration by which speech data is input.

The storing unit 130 stores therein a rule table 131 that defines a rule for selecting a responding user and a responding method that are in correspondence with a cause of error that has been detected. The storing unit 130 may be configured with any type of recording medium that is generally used, like a Hard Disk Drive (HDD), an optical disk, a memory card, or a Random Access Memory (RAM).

FIG. 2 is a drawing for explaining an example of the data structure of the rule table 131. As shown in the drawing, the rule table 131 stores therein, in correspondence with one another, types of causes, detected causes of errors, responding users, and response examples.

The "types of causes" is information used for classifying detected causes of errors. The rate of speech, the sound volume of the voice, and the noise are specified as types of causes. According to the first embodiment, as for causes that have effect on problems in speech recognition, information related to acoustics of the voice is specified as the causes of errors.

As for a "detected cause of error", for example, when the type of cause is the rate of speech, detecting that the rate of speech of the entire voice is high or low as a cause of error is specified.

As for a "responding user", a user that serves as the target of a response to solve the cause of error, in other words, a user to whom a means of solution to solve the cause of error should be presented, is specified. According to the first embodiment, a user that is suitable for solving the problem with the means of solution is specified, out of the speaker who has input speech to the input receiving unit 101 and a conversation partner to whom the result of the recognition is presented.

When the speech processing apparatus 100 itself executes the response, the speech processing apparatus 100 is specified as the responding user. In the drawing, examples in which "the speaker" is specified to indicate that the response is returned to the speaker that has uttered the voice and in which "the owner" who owns the speech processing apparatus 100 is specified are shown.

As for a "response example", information that indicates the contents of each response presented to the responding user is specified. For example, as shown in the drawing, for a cause of error that the rate of the entire voice is high, a response example of presenting a message that means "Please speak more slowly" is specified. In the examples in the drawing, messages based on a premise that the user executes the response are used as the response examples. However, it is also acceptable to specify other response examples in which the speech processing apparatus 100 itself performs a volume adjusting processing. In such a situation, information indicating the speech processing apparatus 100 itself is specified as the responding user.

Another arrangement is acceptable in which the rule that is stored in the rule table 131 is read, as necessary, from an external information processing apparatus (not shown) or the like.

The input receiving unit 101 receives the input of speech data that is input from the speech input unit 121 or the like. The input receiving unit 101 also forwards the received speech data to the recognizing unit 102 and to the detecting unit 103.

Another arrangement is acceptable in which the input receiving unit 101 receives speech data from an external information processing apparatus (not shown) via the communicating unit 122 and receives an input of the received speech data. In such a situation, an arrangement is acceptable in which the input receiving unit 101 performs, as necessary, a decryption processing, a decoding processing, a format converting processing, a rate converting processing, or the like on the speech data that has been encrypted by the external information processing apparatus.

The recognizing unit 102 analyzes the speech data forwarded from the input receiving unit 101 so as to extract a characteristic amount that is necessary in the recognition process of the speech data. The recognizing unit 102 then outputs, to the method selecting unit 104, a word or a word sequence that is acoustically most similar, as a result of recognition, by referring to a dictionary that is learned in advance. Also, the recognizing unit 102 detects speech section information that indicates one or more durations within the input speech data in each of which the speaker has produced a voice, and outputs the detected speech section information to the detecting unit 103. The speech section information is referred to when the detecting unit 103 calculates a rate of speech or the like.

For the speech recognition processing performed by the recognizing unit 102, any of various methods that have been conventionally used may be employed; for example, a hidden Markov model, a neural network, Dynamic Programming (DP) matching, or the like may be used.

The detecting unit 103 analyses the speech data forwarded from the input receiving unit 101, detects one or more elements that affect the performance level in the speech recognition process as the causes of errors, and outputs the detected causes of errors to the method selecting unit 104. Examples of the elements that affect the performance level in the speech recognition process include the sound environment observed in the surroundings of the location where speech takes place and the speaking style of the speaker.

As for the sound environment, examples include noises that are observed constantly or suddenly in the background of the environment in which the speech processing apparatus 100 is used, like the sound of a car driving by on the street or the sound of keyboard typing in the office. As for the speaking style, examples include the sound volume of the voice becoming small at the end thereof and the rate of speech being high.

As explained later, according to the first embodiment, the detecting unit 103 detects the rate of speech, the sound volume of the voice, and the noise as the causes of errors.

When the detecting unit 103 has detected a cause of error, the method selecting unit 104 determines a means of solution that is in correspondence with the detected cause of error and outputs the determined means of solution to the user selecting unit 105 and the executing unit 106.

To be more specific, the method selecting unit 104 obtains a response example that is in correspondence with the cause of error detected by the detecting unit 103, out of the rule table 131, and determines the responding method indicated by the obtained response example as the means of solution.

The user selecting unit 105 selects a user to whom the means of solution determined by the method selecting unit 104 should be presented. To be more specific, the user selecting unit 105 obtains the responding user that is in correspondence with the cause of error detected by the detecting unit 103, out of the rule table 131, and selects the obtained responding user as the user to whom the means of resolution should be presented.

The executing unit 106 executes a response by presenting the means of solution determined by the method selecting unit 104 to the responding user selected by the user selecting unit 105. The executing unit 106 executes the response by displaying the response example, which is an instruction for solving the problem, in text on the display screen in a language that the responding user can understand.

The method used for executing the response is not limited to this example. It is acceptable to present the means of solution by performing speech synthesis on the text and playing back the synthesized sound. Alternatively, it is acceptable to execute the response using an active method in which, for example, the speech processing apparatus 100 itself changes the settings in the speech recognition process, instead of a passive method in which the user receives an instruction as described above.

Next, the speech processing performed by the speech processing apparatus 100 according to the first embodiment configured as above will be explained. FIG. 3 is a flow chart of an overall procedure in the speech processing according to the first embodiment.

Firstly, the input receiving unit 101 receives an input of speech uttered by a user (step S301). Next, the recognizing unit 102 performs a speech recognition processing on the received speech (step S302). During the speech recognition processing, any of various speech recognition methods that are generally used, such as an HMM, a neural network, DP matching, may be employed, as mentioned earlier.

Next, the detecting unit 103 performs an error cause detection processing (step S303). The details of the error cause detection processing will be explained later.

Subsequently, the detecting unit 103 judges whether any cause of error has been detected (step S304). When one or more causes of error have been detected (step S304: Yes), the method selecting unit 104 obtains a means of solution that is in correspondence with the detected cause of error, out of the rule table 131 (step S305). For example, when a cause of error "the sound volume of the entire voice is large" has been detected, out of the causes classified into the type of causes "the sound volume of the voice", the method selecting unit 104 determines the responding example that means "Please adjust the sound volume" as the means of solution, out of the rule table 131 shown in FIG. 2.

Next, the user selecting unit 105 obtains the responding user that is in correspondence with the detected cause of error out of the rule table 131 (step S306). For example, when a cause of error "the sound volume of the entire voice is large" has been detected, the user selecting unit 105 selects "the owner" as the responding user, out of the rule table 131 shown in FIG. 2.

As explained above, according to the first embodiment, it is possible to specify not only the speaker but also the owner of the apparatus as the responding user. In other words, the user selecting unit 105 is able to switch the responding user according to the contents of the cause of error, so that the feedback is returned to the user who is able to address to the problem. This arrangement is made based on a notion that the speech processing apparatus 100 aims to support conversations among people, and that there is a possibility that the speaker may not be able to address to the problem, even if an instruction that means "Please adjust the sound volume" is given to the speaker, because the speaker is not necessarily an owner of the apparatus who is familiar with the operation of the apparatus.

Subsequently, the executing unit 106 executes the response indicated by the means of solution, to the obtained responding user (step S307), and thus the speech processing is completed. For example, when a cause of error "the sound volume of the entire voice is large" has been detected, the executing unit 106 executes a response to display a message that means "Please adjust the sound volume" on the display screen.

At step S304, when the detecting unit 103 has judged that no cause of error has been detected (step S304: No), the executing unit 106 outputs a result of the speech recognition (step S308), and thus the speech processing is completed.

Figure 4:
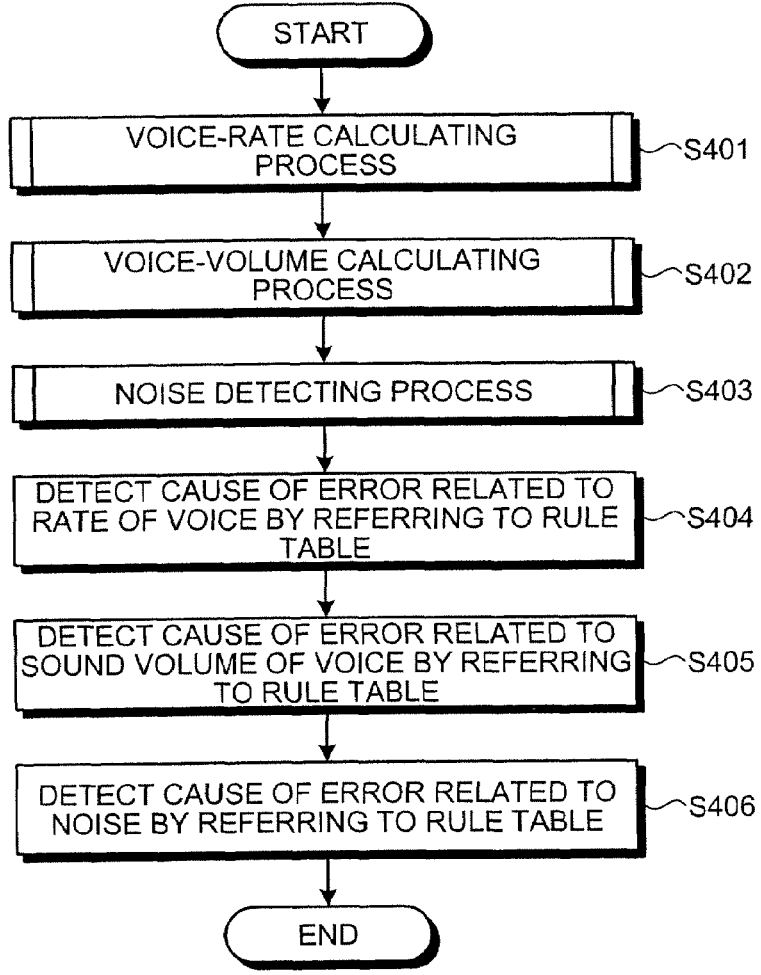
FIG. 4 is a flow chart of an overall procedure of an error cause detection processing.

Next, the details of the error cause detection processing at step S303 will be explained. FIG. 4 is a flow chart of an overall procedure of the error cause detection processing.

During the error cause detection processing, the detecting unit 103 calculates, as acoustic information, the rate of speech, the sound volume of the voice (the voice-volume), and the noise, and detects a cause of error based on the calculated information.

To be more specific, firstly, the detecting unit 103 performs a speaking rate calculation processing (step S401) to calculate the rate of speech in speech uttered by the speaker. Next, the detecting unit 103 performs a voice-volume calculation processing (step S402) to calculate the sound volume of the voice uttered by the speaker. Subsequently, the detecting unit 103 performs a noise detection processing (step S403) to detect the noise that is present in the background of the voice.

The order in which these types of processing are performed may be changed. The details of the speaking rate calculation processing, the voice-volume calculation processing, and the noise detection processing will be explained later.

After the rate of speech, the sound volume of the voice, and the noise have been calculated or detected through the processing at steps S401 to S403, the detecting unit 103 detects a cause of error that is related to the rate of speech, by referring to the rule table 131 (step S404).

For example, the detecting unit 103 compares the rate of speech calculated in the speaking rate calculation processing with a threshold value that indicates a maximum value of a rate of speech that is determined in advance. When the calculated rate of speech is higher than the maximum value, the detecting unit 103 detects the rate of speech being too high as a cause of error. Also, the detecting unit 103 compares the rate of speech with a threshold value that indicates a minimum value of the rate of speech that is determined in advance. When the calculated rate of speech is lower than the minimum value, the detecting unit 103 detects the rate of speech being too low as a cause of error.

Figure 5:
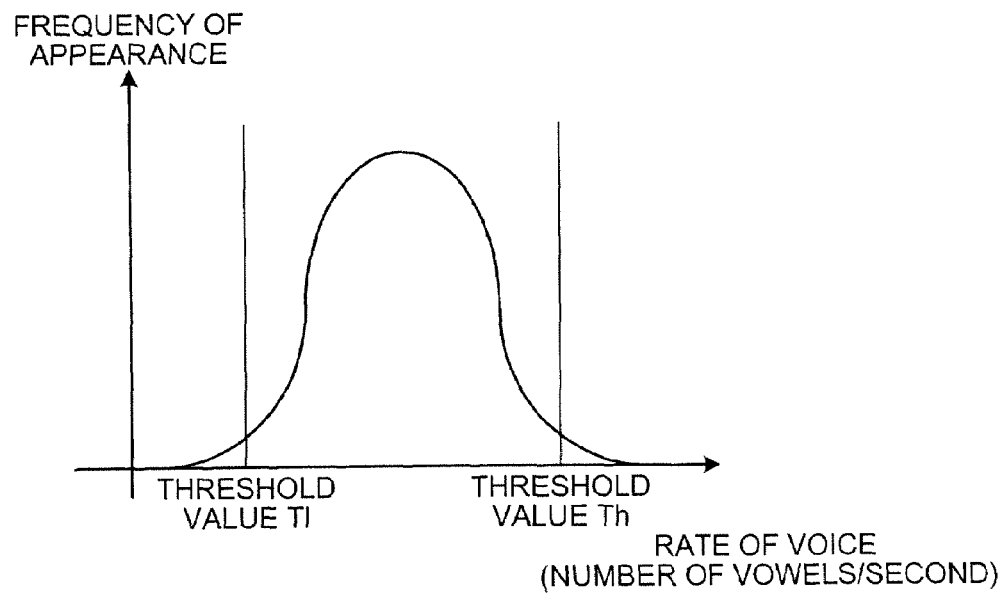
FIG. 5 is a drawing for explaining an example of a distribution of rates of voice.

Next, the method used for setting the threshold values of the rate of speech will be explained. FIG. 5 is a drawing for explaining an example of a distribution of rates of speech. In the method for setting the threshold values of the rate of speech used in the example, a distribution of rates of speech as shown in FIG. 5 is obtained in advance, and the rates of speech of which the frequency of appearance is equal to or lower than a predetermined value are set as the threshold values. The distribution of rates of speech as shown in the drawing may be, for example, obtained from speech data that is used when a model of speech recognition is learned in advance.

The method for setting the threshold values of the rate of speech is not limited to this example. It is acceptable to apply any method as long as it is possible to set, by using the method, a threshold value that can serve as a border to judge whether it is possible to affect a problem in the speech recognition process. For example, it is acceptable to study the relationship between rates of speech and the performance level in the speech recognition process in advance and to set, as the threshold value, a rate of speech with which the performance level in the recognition process is equal to or lower than a predetermined value.

In addition, in the example above, the cause of error related to the rate of speech of the entire speech section is explained; however, when another arrangement is used in which the speech section is divided into smaller sections so that the rate of speech is calculated for each of the smaller sections, it is possible to detect a cause of error with respect to a portion of the voice, for example, "the rate of speech at the end of a sentence is high".

Further, in the description of the first embodiment, the exemplary method in which whether there is a problem caused by the rate of speech is definitively judged based on the threshold values is explained; however, the method used for judging whether there is a problem in the speech recognition process caused by the rate of speech is not limited to this example. It is acceptable to use any other existing method.

Subsequently, the detecting unit 103 detects a cause of error that is related to the sound volume of the voice, by referring to the rule table 131 (step S405).

In this situation, like in the situation with the rate of speech, the detecting unit 103 compares the sound volume with two predetermined threshold values that indicate a maximum value and a minimum value of the sound volume of the voice. When the sound volume is larger or smaller than the threshold values, the detecting unit 103 detects the voice being too large or too small as a cause of error. As for information indicating the sound volume of the voice, one of an average power and a maximum power is used, the average power being an average value of the powers in each frame and the maximum power being a maximum value of the powers in each frame.

As for the method for setting the threshold values, a method in which the threshold values are set according to the characteristics, like the directivity, of the speech input unit 121 is employed. However, the method used for setting the threshold values for the sound volume of the voice is not limited to this example. It is acceptable to apply any other method as long as it is possible to set, by using the method, a threshold value that can serve as a border to judge whether it is possible to affect a problem in the speech recognition process. For example, it is acceptable to study the relationship between the power and the performance level in the speech recognition process in advance and to set, as a threshold value, a power with which the performance level in the recognition process is equal to or lower than a predetermined value.

Furthermore, it is acceptable to divide the utterance into smaller sections and to calculate the sound volume of the voice for each of the smaller sections so that an error of cause is detected for a portion of the voice.

Next, the detecting unit 103 refers to the rule table 131 and detects a cause of error related to noise (step S406). In the noise detection processing at step S404, it is judged whether there is noise. Thus, at step S406, the detecting unit 103 determines whether the detected noise should be detected as a cause of error, by referring to the rule table 131. In FIG. 2, an example in which a background noise (a constant noise) in the entire voice and a sudden noise in a portion of the voice are both detected as causes of error is shown.

As explained so far, the detecting unit 103 is able to detect the causes of error on which it is difficult for a conversation partner to make judgment, such as the rate of speech, the sound volume of the voice, and the noise.

Next, the details of the speaking rate calculation processing at step S401 will be explained. First of all, the concept of the speaking rate calculation processing will be explained.

In a speech recognition process in recent years, a search is performed by referring to a statistical acoustic model that has been learned from a large amount of voice data. The problem in this method, however, is a voice that largely deviates from the speaking rate distribution of the voice data used in the learning process fails to match the model, and thus it is not possible to obtain a correct recognition result. To solve this problem fundamentally, one idea is to structure a model by learning speech data resulting from voices having a wider range of rates of voice. This method, however, requires that a large amount of speech data should be collected.

To solve the problem without newly structuring a model, another idea is to measure the rate of speech of an entire voice or a portion of a voice and to present, to the user, that the rate of speech is not appropriate in an speech section having an extremely high rate of speech or an extremely low rate of speech, so as to ask the user to make a voice of the duration again.

According to the first embodiment, the latter method is used as an approach to the problem. To calculate the rate of speech, it is necessary to (1) detect speech section from speech data and (2) measure the rate of speech for each of the speech section.

To (1) detect the speech section from the speech data, the speech section information detected by the recognizing unit 102 may be used. To (2) measure the rates of voice, if it was possible to obtain a result of speech recognition that is 100% accurate, it would be possible to utilize the number of phonemes (or syllables) per unit period of time that is obtained by extracting the number of phonemes or syllables contained in an speech section in the result of speech recognition and dividing the extracted number of phonemes or syllables by the length of the speech section.

However, it is not easy to obtain a speech recognition result that is 100% accurate. In addition, the purpose is to detect a rate of speech at which a problem occurs in the result of recognition. Thus, it is necessary to consistently measure the rate of speech even for a recognition error, too.

According to the first embodiment, as an example of a method that works consistently for recognition errors, a method in which the rate of speech is estimated by distinguishing vowels or consonants from the rest of the speech. In this method, by making distinction on the two groups, namely, the vowels and the consonants, which are more easily distinguished than phonemes that could be complicated, the number of phonemes (or syllables) in an speech section is calculated based on the detected number of vowels, in an approximative manner. In the Japanese language, basically, moras each made up of a vowel and a consonant that are combined together can be used as the units of the language. In other foreign languages like English, each syllable is structured with a vowel as its core. Thus, to roughly measure the rate of speech, there is no problem in approximating the number of syllables by using the number of vowels.

Figure 6:
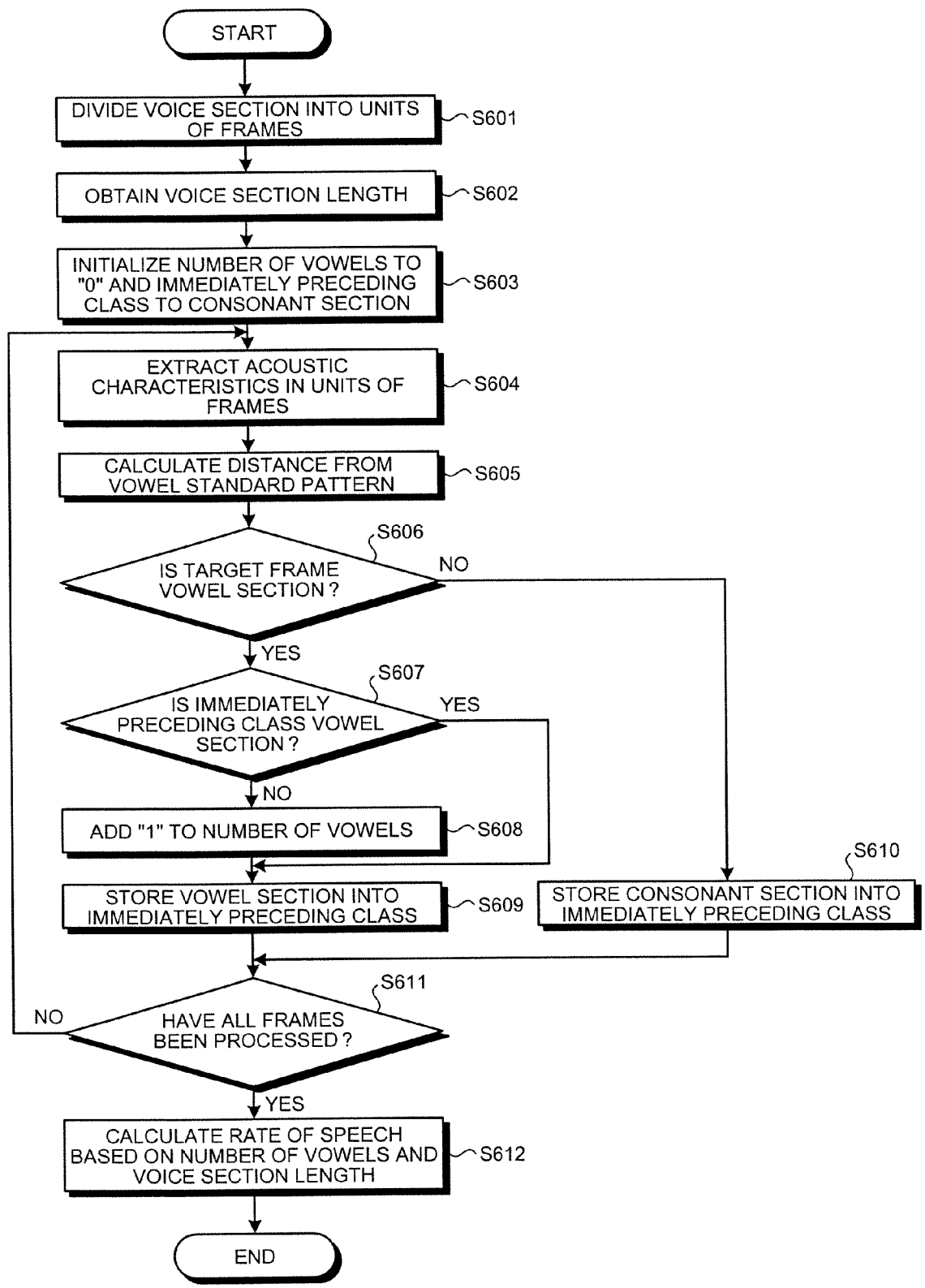
FIG. 6 is a flow chart of an overall procedure in a speaking rate calculation processing.

In the following section, the details of the speaking rate calculation processing in which the method described above is used will be explained. FIG. 6 is a flow chart of an overall procedure in the speaking rate calculation processing.

Firstly, the detecting unit 103 divides a speech section into units of frames (step S601) and obtains the length of the speech section (step S602). To obtain the length of the speech section, the speech section information detected by the recognizing unit 102 may be used, as mentioned above. The speech section is divided into the frames so that each frame has a length suitable for the calculation of the rate of speech. According to the first embodiment, the speech section is divided so that the frame period is 10 milliseconds and the frame length is 25 milliseconds.

Next, the detecting unit 103 initializes the number of vowels to "0" and an immediately preceding class to "a consonant section" (step S603). The immediately preceding class is information that stores therein a result of a judgment indicating whether the immediately preceding frame is "a vowel" or "a consonant". One of "a vowel section" or "a consonant section" is specified as the immediately preceding class.

Next, for each of the frames resulting from the division, the detecting unit 103 analyzes the speech data in units of the frames and extracts acoustic characteristics (step S604). According to the first embodiment, as the method for extracting the acoustic characteristics, a Mel Frequency Cepstrum Coefficient (MFCC) is used. It is possible to obtain an MFCC by putting speech data that has been spectralized through a Fourier transform into Mel scale band filters, and applying a reverse Fourier transform on a logarithmic converted value.

The acoustic characteristics are not limited to the MFCC. It is acceptable to use any other acoustic characteristics as long as they are useful in the calculation of the rate of speech.

Subsequently, the detecting unit 103 calculates the distance between the extracted MFCC and a vowel standard pattern (step S605). For the vowel standard pattern, a pattern that is generated by learning, in advance, from a large amount of speech data is used. Any of various methods that have conventionally been used may be employed as the method for calculating the distance.

Next, the detecting unit 103 judges whether the frame being a target is a vowel section (step S606). To be more specific, the detecting unit 103 sets, in advance, a threshold value for distinguishing vowels from consonants. When the section has a value smaller than the threshold value, the section is judged to be a vowel section. When the section has a value equal to or larger than the threshold value, the section is judged to be a consonant section.

When the section is judged to be a vowel section (step S606: Yes), the detecting unit 103 judges whether the immediately preceding class is a vowel section (step S607).

When having judged that the immediately preceding class is not a vowel section (step S607: No), the detecting unit 103 adds "1" to the number of vowels (step S608). The reason is because it is appropriate to judge that the first section of the vowel has been detected.

After "1" is added to the number of vowels at step S608, or if it has been judged that the immediately preceding class is a vowel section at step S607 (step S607: Yes), the detecting unit 103 stores "a vowel section" into the immediately preceding class (step S609).

When the immediately preceding class is judged to be a vowel section at step S607, no addition is performed on the number of vowels because it is appropriate to judge that the immediately preceding class is positioned somewhere in the middle of vowel sections that are continuous.

When it has been judged at step S606 that the frame being the target is not a vowel section (step S606: No), the detecting unit 103 stores "a consonant section" into the immediately preceding class (step S610).

Subsequently, the detecting unit 103 judges whether all the frames have been processed (step S611). When not all the frames have been processed (step S611: No), the acoustic characteristics of the next frame are extracted, and the processing is repeated (step S604).

When all the frames have been processed (step S611: Yes), the detecting unit 103 calculates the rate of speech based on the number of vowels and the length of the speech section (step S612), and thus the speaking rate calculation processing is completed.

The detecting unit 103 calculates, as the rate of speech, the number of vowels per unit period of time, which is obtained by dividing the number of vowels by the length of speech section. According to the first embodiment, the method in which the rate of speech is calculated based on the distinction between vowels and consonants; however, the method for calculating the rate of speech is not limited to this example. It is acceptable to use any other existing method.

Next, the details of the voice-volume calculation processing at step S402 will be explained. First of all, the concept of the voice-volume calculation processing will be explained.

Examples of problems that occur during a speech recognition process due to the sound volume of speech (the loudness of voice) include, as shown in FIG. 2, an entire voice having a large (or small) sound volume and a portion of a voice having a large (or small) sound volume.

When a voice that has bee input is within a range that is equal to or larger than a dynamic range expected by the input receiving unit 101, the speech data is rounded off. Because the speech data that has been rounded off has a distortion, the speech data fails to match a learned acoustic model properly, and this situation becomes a cause of a recognition error.

On the contrary, for speech that is uttered from a location away from the apparatus and speech that includes a voice with a very small sound volume, the speech data is input within a dynamic range that is smaller than expected. Information that is necessary for identifying phonemes is missing from the speech data being in the smaller dynamic range. Thus, the speech data fails to match a learned acoustic model properly, and this situation becomes a cause of a recognition error.

One of the methods that can be used to solve these problems is to adjust, in advance, the sound volume of the speech being input to the input receiving unit 101, according to the environment of use. Another method is to dynamically correct the sound volume during uttering a voice. For example, when a job activity report needs to be prepared in a quiet environment such as a business office, there are few changes in the environment and also the speakers are fixed. Thus, it is possible to apply the method in which the sound volume is adjusted in advance. Alternatively, by using headset microphones, it is also possible to dynamically adjust the sound volume, because it is possible to estimate the distance between the microphone and the mouth of each speaker.

However, when the speech processing apparatus 100 is used in an actual environment in a wider range, for example, when a user tries to communicate with someone in an urban area with a terminal in his/her hand, it is not easy to adjust the sound volume in advance. In addition, because the distance between the microphone and the speaker is not fixed, it is not easy to dynamically adjust the sound volume.

As a solution other than the adjustment in advance and the dynamic adjustment, it is acceptable to use another method in which a power of an entire voice or a portion of a voice is measured so that information indicating that the sound volume of the speech is inappropriate is presented to the user when there is an speech section that has an extremely large or small power, and the user is asked to utter a voice of the corresponding duration again.

According to the first embodiment, the latter method is adopted as an approach to the solution. To calculate the sound volume of the speech, it is necessary to (1) detect speech section from speech data and (2) measure the power for each of the speech section. To (1) detect the speech section from the speech data, the speech section information detected by the recognizing unit 102 may be used.

In the following section, the details of the voice-volume calculation processing in which the method described above is used will be explained.

Figure 7:
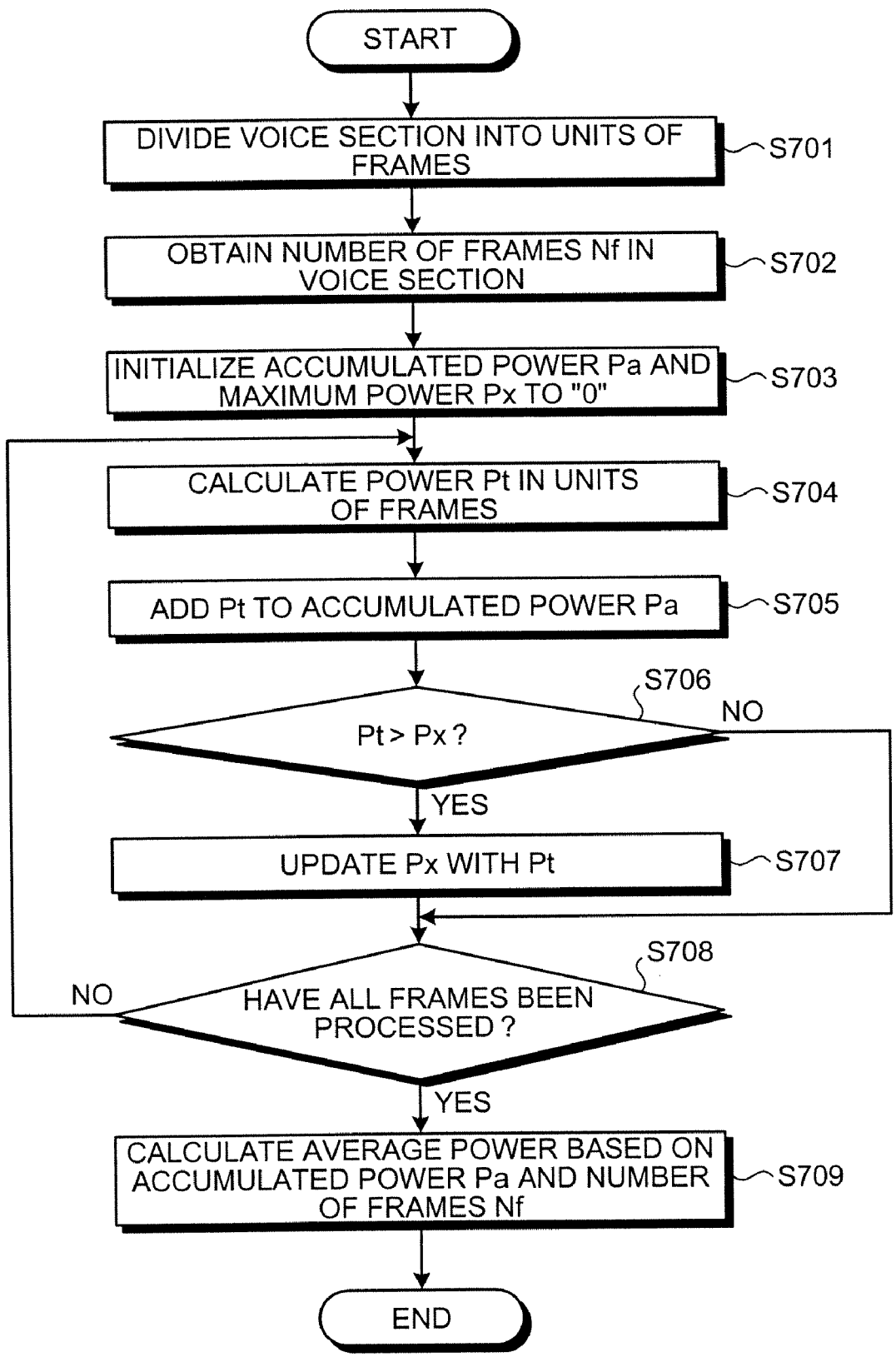
FIG. 7 is a flow chart of an overall procedure in a voice-volume calculation processing.

FIG. 7 is a flow chart of an overall procedure in the voice-volume calculation processing.

Firstly, the detecting unit 103 divides an speech section into units of frames (step S701) and obtains the number of frames Nf in the speech section (step S702). As for the speech section, the speech section information detected by the recognizing unit 102 may be used, as mentioned above. The speech section is divided into the frames so that each frame has a length suitable for the calculation of the power. According to the first embodiment, the speech section is divided so that the frame period is 10 milliseconds and the frame length is 25 milliseconds.

Next, the detecting unit 103 initializes an accumulated power Pa and a maximum power Px to "0" (step S703).

Subsequently, the detecting unit 103 calculates a power Pt in units of the frames (step S704). As the method for calculating the power, any of various methods that have conventionally been used may be employed. For example, a method in which the power of the speech data is calculated using a Fast Fourier Transform (FFT) may be used.

Next, the detecting unit 103 adds the calculated power Pt to the accumulated power Pa (step S705). Subsequently, the detecting unit 103 judges whether the power Pt is larger than the maximum power Px (step S706).

When the power Pt is larger than the maximum power Px (step S706: Yes), the detecting unit 103 updates the maximum power Px with the power Pt (Step S707).

After the maximum power Px is updated, or if it has been judged that the power Pt is not larger than the maximum power Px (Step S706: No), the detecting unit 103 judges whether all the frames have been processed (step S708).

When not all the frames have been processed (step S708: No), the power of the next frame is calculated, and the processing is repeated (step S704).

When all the frames have been processed (step S708: Yes), the detecting unit 103 calculates an average power based on the accumulated power Pa and the number of frames Nf (step S709), and thus the voice-volume calculation processing is completed.

The detecting unit 103 calculates the average power by dividing the accumulated power Pa by the number of frames Nf. In the description of the first embodiment, the method in which the average power and the maximum power in the speech section are used to calculate the sound volume of the voice is explained; however, the method for calculating the sound volume of the voice is not limited to this method. It is acceptable to use any other existing method.

Next, the details of the noise detection processing at step S403 will be explained. First of all, the concept of the noise detection processing will be explained.

In an actual environment, there are various types of noise, and noise has a notable effect on a speech recognition process. Examples of noise include a constant noise that is constantly observed in a speech environment and a sudden noise that is suddenly observed.

The constant noise denotes a type of noise that has little power fluctuation and is observed constantly, such as noise from an air-conditioner in a room or noise on the street. The sudden noise denotes a type of noise that is observed suddenly, such as a sound of typing on a keyboard or a passing sound of a car.

To solve the problem of the noises fundamentally, one method may be to eliminate noise components in an initial stage of a speech recognition process. Another method may be to structure an acoustic model on which noise components are reflected. However, because there are many types of noises that have various acoustic characteristics, it is not easy to realize a noise elimination processing that consistently works on every type of noise or to structure an acoustic model by collecting every type of noise data.

As a solution other than the noise elimination and the noise acoustic model structuring, it is acceptable to use another method in which the noise in an entire voice or in a portion of voice is detected so that a method of solving the problem is presented to the user when there is an speech section in which noise is overlapping the speech, and the user is asked to utter a voice of the corresponding section again.

According to the first embodiment, the latter method is adopted as an approach to the solution. According to the first embodiment, an example in which constant noise and sudden noise are detected, and a method for solving the problem according to the detected noises is presented will be explained. As for the method for detecting the constant noise and the sudden noise, a method that detects only the presence of constant noise and sudden noise will be used. In this method, the types of noise will not be identified in detail, and the difference in the patterns of overlapping noise will not be identified, either.

To detect the constant noise, a detection method in which a judgment standard is used may be employed. Examples of the judgment standard may be, for example, whether the length of a duration that is detected as a speech exceeds a period of time during which it is physiologically possible to utter a voice, or whether the power near the speech section exceeds a threshold value.

To detect the sudden noise, a detection method in which another judgment standard is used may be employed. Examples of the judgment standard may be, for example, whether there is a duration that has a short period and has an extremely large power. According to the first embodiment, the method of detecting the constant noise by calculating the duration length of a speech section and the power in the neighboring frames and also the method of detecting the sudden noise by calculating a local maximum power length will be used.

In this situation, the speech section length denotes information that indicates the length of a speech section in which a voice is continued. The neighboring frames denote frames in a predetermined range before and after the frame in which the noise is to be detected. The local maximum power length denotes the length for which a section lasts within a frame, the section having a power that is larger than a predetermined threshold value (hereinafter, "the first threshold value"), compared to the neighboring frames.

Figure 8:
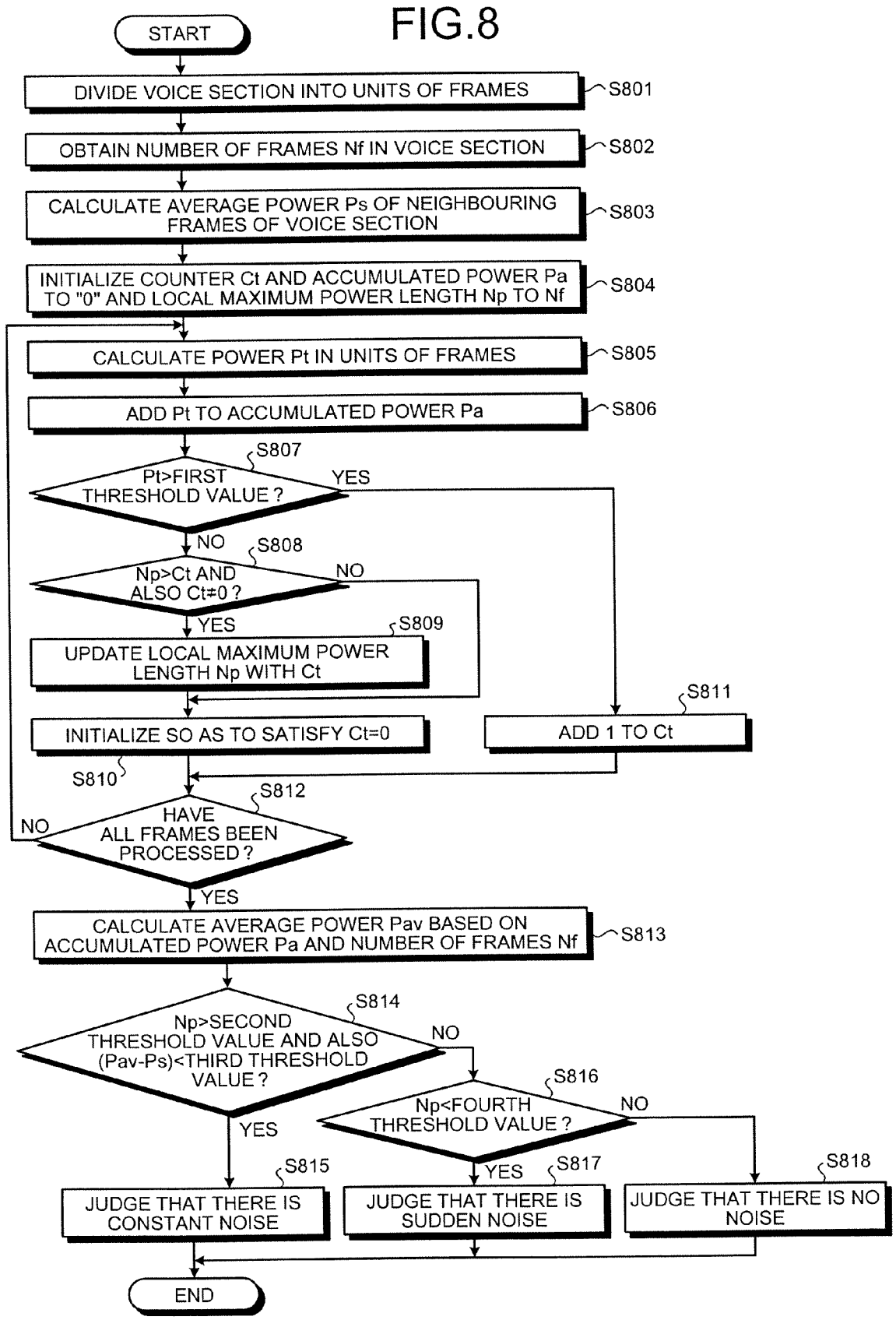
FIG. 8 is a flow chart of an overall processing in a noise detection processing.

In the following section, the details of the noise detection processing in which the method described above is used will be explained. FIG. 8 is a flow chart of an overall processing in the noise detection processing.

Firstly, the detecting unit 103 divides a speech section into units of frames (step S801) and obtains the number of frames Nf in the speech section (step S802). As for the speech section, the speech section information detected by the recognizing unit 102 may be used, as mentioned above. The speech section is divided into the frames so that each frame has a length suitable for the measurement of the noise. According to the first embodiment, the speech section is divided so that the frame period is 100 milliseconds and the frame length is 250 milliseconds. In the following explanation, the number of frames Nf in the speech section is used as information that indicates the speech section length.

Next, the detecting unit 103 calculates an average power Ps of the neighboring frames of the speech section (step S803). As the method for calculating the power, as mentioned earlier, any of various methods that have conventionally been used may be employed. For example, a method in which FFT is used may be employed.

Next, the detecting unit 103 initializes the counter Ct to "0", the local maximum power length Np to Nf, and the accumulated power Pa to "0" (step S804). In this situation, the counter Ct is information used for counting frames in each of which the power is larger than the predetermined first threshold value.

Next, the detecting unit 103 calculates the power Pt in units of the frames (step S805). Subsequently, the detecting unit 103 adds the calculated power Pt to the accumulated power Pa (step S806).

Then, the detecting unit 103 judges whether the calculated power Pt is larger than the first threshold value (step S807).

When it has been judged that the calculated power Pt is not larger than the first threshold value (step S807: No), the detecting unit 103 judges whether both of the following are satisfied: the local maximum power length Np is larger than the counter Ct, and the counter Ct is not "0" (step S808).

When the local maximum power length Np is larger than the counter Ct and also the counter Ct is not "0" (step S808: Yes), the detecting unit 103 updates the local maximum power Np with the counter Ct (step S809).

If none or only one of the following is satisfied (step S808: No), the detecting unit initializes the counter Ct to "0" (step S810): the local maximum power length Np is larger than the counter Ct, and the counter is not "0".

At step S807, when it has been judged that the calculated power Pt is larger than the first threshold value (step S807: Yes), the detecting unit 103 adds "1" to the counter Ct (Step S811).

Next, the detecting unit 103 judges whether all the frames have been processed (step S812).

When not all the frames have been processed (step S812: No), the power of the next frame is calculated, and the processing is repeated (step S805).

When all the frames have been processed (step S812: Yes), the detecting unit 103 calculates an average power Pav based on the accumulated power Pa and the number of frames Nf (step S813).

Subsequently, the detecting unit 103 judges whether both of the following are satisfied: the local maximum power length Np is larger than a predetermined threshold value (hereinafter, "the second threshold value"), and the difference between the average power Pav and the average power Ps of the neighboring frames is smaller than a predetermined threshold value (hereinafter, "the third threshold value") (step S814).

When the local maximum power Np is larger than the second threshold value and also the difference between the average power Pav and the average power Ps of the neighboring frames is smaller than the third predetermined threshold value (Step S814: Yes), the detecting unit 103 judges that the current frame has constant noise (step S815), and thus, the noise detection processing is completed.

If none or only one of the following is satisfied (step S814: No), the detecting unit 103 judges whether the local maximum power length Np is smaller than a predetermined threshold value (hereinafter "the fourth threshold value") (Step S816): the local maximum power length Np is larger than the second threshold value, and the difference between the average power Pav and the average power Ps of the neighboring frames is smaller than the third threshold value.

When the local maximum power length Np is smaller than the fourth threshold value (step S816: Yes), the detecting unit 103 judges that the current frame has sudden noise (step S817), and thus, the noise detection processing is completed.

When the local maximum power length Np is not smaller than the fourth threshold value (step S816: No), the detecting unit 103 judges that the current frame has no noise (step S818), and thus, the noise detection processing is completed.

In the example describe above, as the method for detecting problems due to noise, the method in which the speech section length, the neighboring frame power, and the local maximum power duration length are used is explained; however, the method for detecting problems due to noise is not limited to this example. It is acceptable to use any other existing method.

As explained so far, when the speech processing apparatus according to the first embodiment is used, it is possible to detect the acoustic causes of errors that are present in a voice and that the user is not able to recognize normally, and also to switch the responding user in accordance with the contents of the causes of errors. Accordingly, the user is able to understand the causes of errors and to avoid the risk of having the conversation end up in failure because of making the same mistake. In addition, it is possible to reduce unnecessary interactions because the feedback is returned to only the user who is able to address to the problem. Thus, it is possible to continue the conversation smoothly.

With a speech processing apparatus according to a second embodiment, during a speech translation processing in which a result of a speech recognition process performed on the contents of speech uttered in a first language is translated into a second language and is output to a conversation partner, acoustic causes of errors that occur during the speech processing are detected, and the responding user is switched according to the contents of the detected causes of errors.

As explained here, the second embodiment is an example in which the contents of the present invention described above is applied to a speech translation apparatus that supports conversations among users who speak mutually different languages. In the following explanation, an example in which the speech processing apparatus has a translation function between Japanese and English is used; however, the combination of the source language and the target language used in the translation process is not limited to this example. It is acceptable to apply the invention to any combination of languages.

Figure 9:
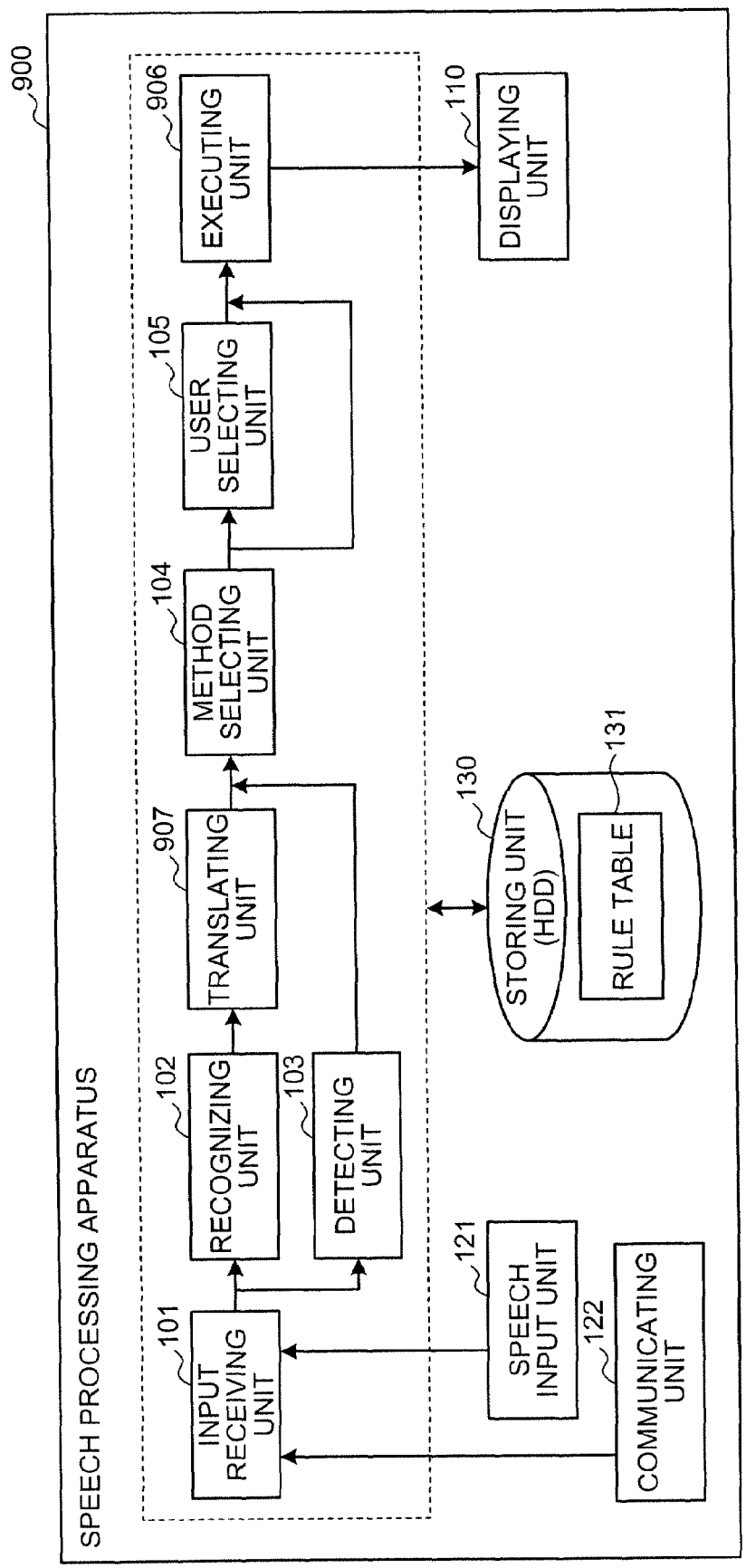
FIG. 9 is a block diagram of a speech processing apparatus according to a second embodiment.

FIG. 9 is a block diagram of a speech processing apparatus 900 according to the second embodiment. As shown in the drawing, the speech processing apparatus 900 includes the input receiving unit 101, the recognizing unit 102, the detecting unit 103, the method selecting unit 104, the user selecting unit 105, an executing unit 906, a translating unit 907, the displaying unit 110, the speech input unit 121, the communicating unit 122, and the storing unit 130.

The second embodiment is different from the first embodiment in that the translating unit 907 is added, and the executing unit 906 has functions that are different from those described in the first embodiment. Other configurations and functions are the same as those shown in FIG. 1, which is a block diagram of the speech processing apparatus 100 according to the first embodiment. Thus, the same reference characters are used to refer to those elements in common, and the explanation thereof will be omitted.

The translating unit 907 receives a character string in a source language that is a result of a speech recognition process and has been output by the recognizing unit 102, converts the received character string into one in a target language, and outputs the target language character string to the method selecting unit 104. In the translation processing performed by the translating unit 907, any of the translation techniques that have conventionally been used, like rule-based translation and example-based translation, may be employed.

The executing unit 906 is different from the executing unit 106 according to the first embodiment in that the executing unit 906 executes a response after switching the language used in the display, according to whether the responding user is a source language user that speaks the source language or a target language user that speaks the target language. Also, the executing unit 906 is different from the executing unit 106 according to the first embodiment in that, when no cause of error has been detected, the executing unit 906 outputs a translation result obtained by translating a speech recognition result, instead of outputting the speech recognition result.

Figure 10:
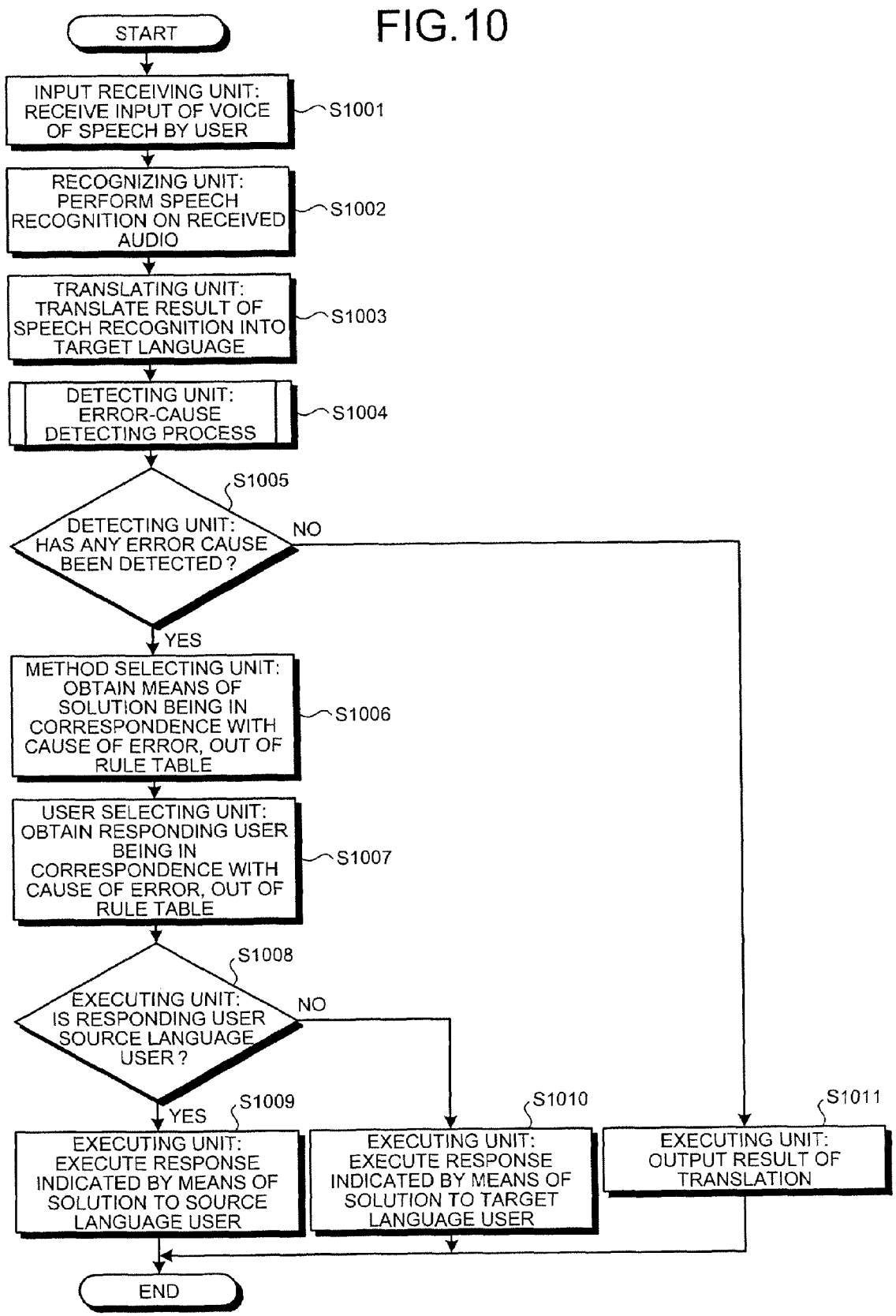
FIG. 10 is a flow chart of an overall procedure in a speech processing according to the second embodiment.

Next, the speech processing performed by the speech processing apparatus 900 according to the second embodiment will be explained. FIG. 10 is a flow chart of an overall procedure in the speech processing according to the second embodiment.

The speech input processing and the speech recognition processing at steps S1001 through S1002 are the same as the processing at steps S301 through S302 performed by the speech processing apparatus 100 according to the first embodiment. Thus, the explanation thereof will be omitted.

After the speech recognition processing is performed, the translating unit 907 translates the result of the speech recognition into a target language (step S1003). The translation processing is performed using a method such as rule-based translation or example-based translation, as mentioned above.

The error cause detection processing, the method selection processing, and the responding user selection processing at steps S1004 through S1007 are the same as the processing at steps S303 through S306 performed by the speech processing apparatus 100 according to the first embodiment. Thus, the explanation thereof will be omitted.

After a responding user is selected at step S1007, the executing unit 906 judges whether the responding user is a source language user (step S1008). To be more specific, the executing unit 906 judges whether the responding user is a source language user based on the language used by the speaker detected during the speech recognition process, the responding user selected in the responding user selection processing, and the language of the owner that is specified in advance. For example, when the voice uttered by the speaker is in the source language and the selected responding user is the speaker, the responding user is judged to be a source language user.

When it has been judged that the responding user is a source language user (step S1008: Yes), the executing unit 906 executes a response indicated by the means of solution, to the source language user, in the source language (step S1009).

When it has been judged that the responding user is not a source language user, i.e. the responding user is a target language user (step S1008: No), the executing unit 906 executes the response indicated by the means of solution, to the target language user, in the target language (step S1010).

At step S1005, when the detecting unit 103 has judged that no cause of error has been detected (step S1005: No), the executing unit 906 outputs a result of the translation (step S1011), and thus, the speech processing is completed.

Figure 11:
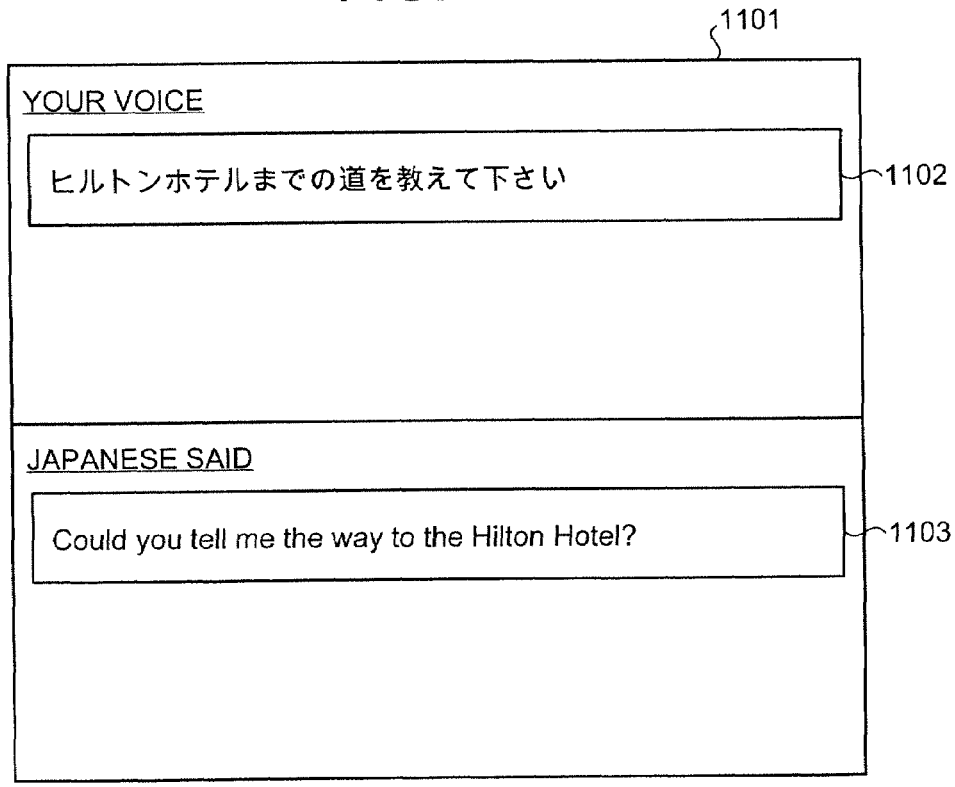
FIG. 11 is a drawing for explaining an example of a display screen on which a translation result is output.

FIG. 11 is a drawing for explaining an example of a display screen on which a translation result has been output. As shown in the drawing, on a display screen 1101, a display field 1102 for displaying a result of speech recognition in a source language and a display field 1103 for displaying a result of translation in a target language are displayed.

When no cause of error has been detected (step S1005: No), a result of translation from the speech recognition result shown in display field 1102 will be displayed in the display field 1103.

Next, a specific example of the speech processing performed by the speech processing apparatus 900 according to the second embodiment configured as above will be explained.

In the following explanation, an example will be used in which the source language user is a Japanese tourist who is the owner of the apparatus, whereas the target language user is an English native speaker who is a local resident in the travel destination of the Japanese tourist and who is not familiar with the operation of the apparatus. In the example, the Japanese tourist asks the local resident about the location of a hotel.

At step S1001, an input of a sentence in Japanese that has been spoken by the source language user and means "Could you tell me the way to the Hilton Hotel?" is received. Subsequently, at steps S1002 and S1003, the recognizing unit 102 and the translating unit 907 convert the contents of the voice in the source language into the target language.

Next, at step S1004, the detecting unit 103 checks to see if there is any error in the speech recognition process by measuring the rate of speech, the sound volume of the voice, and the noise.

In this situation, it is assumed that the sound volume of the last portion of the voice was too small and was not understood. A rule out of the rule table 131 as shown in FIG. 2 will be applied, the rule defining that a response asking the speaker to speak more loudly should be returned to the speaker (steps S1006 and S1007).

Figure 12:
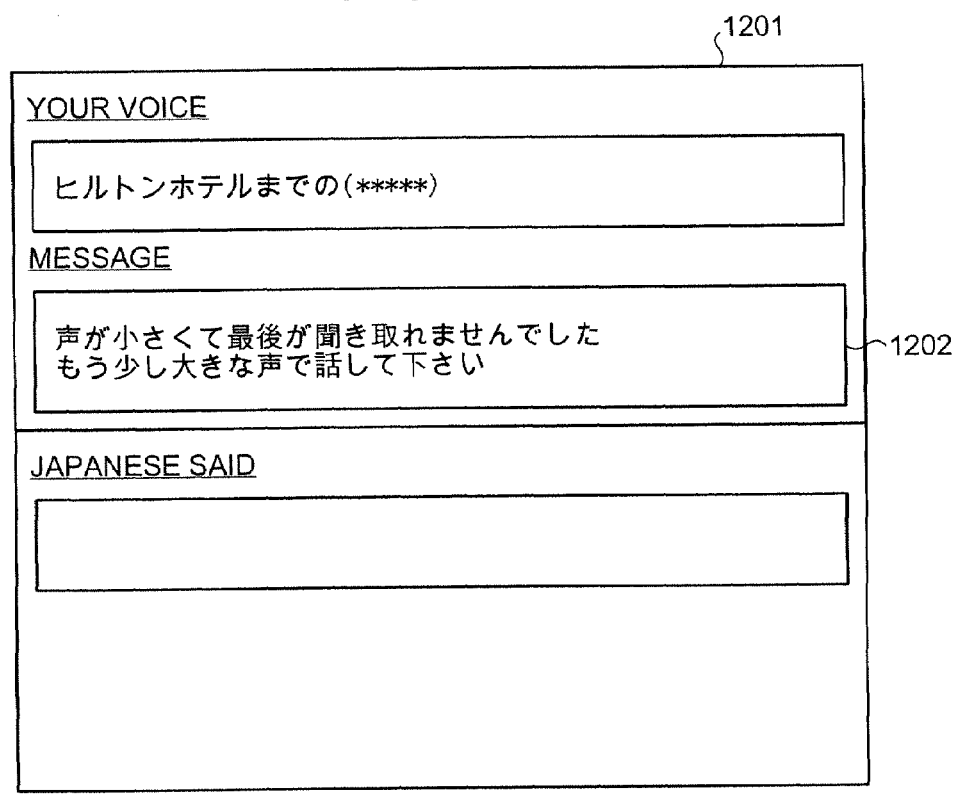
FIG. 12 is a drawing for explaining an example of a display screen on which a response message is output.

FIG. 12 is a drawing for explaining an example of a display screen on which a response message has been output. As shown in the drawing, the display screen 1201 includes a display field 1202 for displaying the response message. A message in Japanese being in correspondence with the response example that has been selected out of the rule table 131 and that means "The last portion of the speech was not understood, because the sound volume was too small. Please speak more loudly." is displayed in the display field 1202.

As explained above, when the speech processing apparatus according to the second embodiment is used, it is possible to detect causes of errors that a user who does not understand the conversation partner's language is not able to notice. Also, it is possible to point out the causes of errors as necessary. In addition, it is possible to switch the responding user so that the feedback is returned to a user who is able to address to the problem, according to the contents of the causes of errors. Accordingly, by pointing out the causes of errors, it is possible to avoid the risk of having the conversation end up in failure because of making the same mistake. In addition, it is possible to reduce unnecessary interactions because the feedback is returned to only the user who is able to address to the problem. Further, it is possible to continue the conversation smoothly even with a conversation partner who is not familiar with the operation of the apparatus. Thus, a user will be able to feel free to communicate even with a foreigner whom the user meets for the first time.

With a speech processing apparatus according to a third embodiment of the invention, a conversation partner points out a portion having an error from a speech recognition result that has been presented so that an acoustic cause of error in the speech is detected within the range that has been pointed out.

Figure 13:
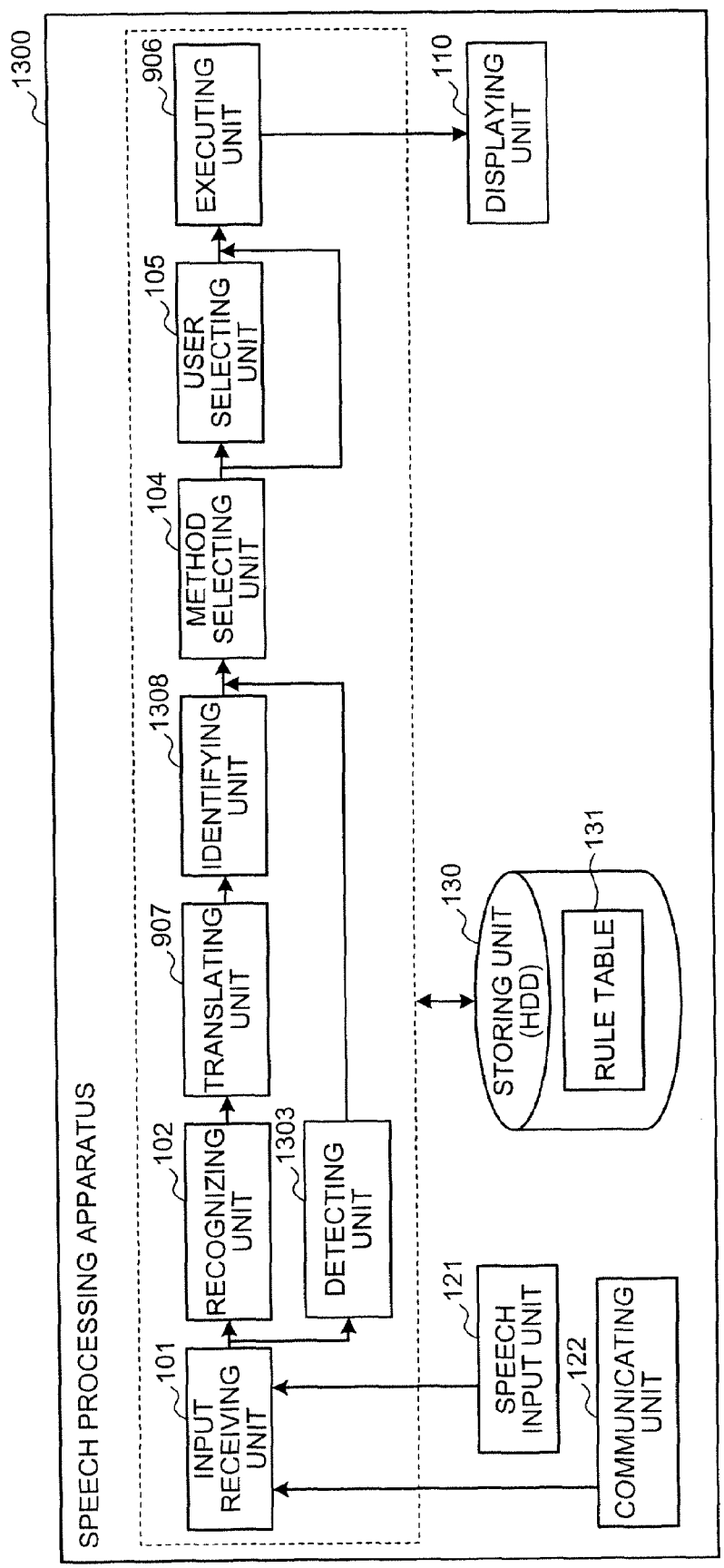
FIG. 13 is a block diagram of a speech processing apparatus according to a third embodiment.

FIG. 13 is a block diagram of the speech processing apparatus according to the third embodiment. As shown in the drawing, a speech processing apparatus 1300 includes the input receiving unit 101, the recognizing unit 102, a detecting unit 1303, the method selecting unit 104, the user selecting unit 105, the executing unit 906, the translating unit 907, an identifying unit 1308, the displaying unit 110, the speech input unit 121, the communicating unit 122, and the storing unit 130.

The third embodiment is different from the second embodiment in that the identifying unit 1308 is additionally included and the detecting unit 1303 has functions that are different from those described in the second embodiment. Other configurations and functions are the same as those shown in FIG. 9, which is a block diagram of the speech processing apparatus 900 according to the second embodiment. Thus, the same reference characters are used to refer to those elements in common, and the explanation thereof will be omitted.

The identifying unit 1308 identifies an error portion that has been specified by a target language user as a portion that was not understood, out of a translation result displayed on the display screen. To be more specific, the identifying unit 1308 identifies, as the error portion, a portion that has been selected using an input device (now shown), such as an operation button, a keyboard, or a touch pen, out of a text of the translation result being displayed on the display screen.

When the identifying unit 1308 has identified the error portion, it is possible to present only the means of solution being in correspondence with the cause of the error that has occurred in the error portion, from among a plurality of causes of errors. It is also possible to request that an error be corrected even if the detecting unit 1303 is not able to judge that there is an error.

The detecting unit 1303 is different from the detecting unit 103 according to the second embodiment in that the detecting unit 1303 detects the cause of error out of a portion of the speech recognition result that corresponds to the error portion identified by the identifying unit 1308, not out of the entire speech recognition result.

Figure 14:
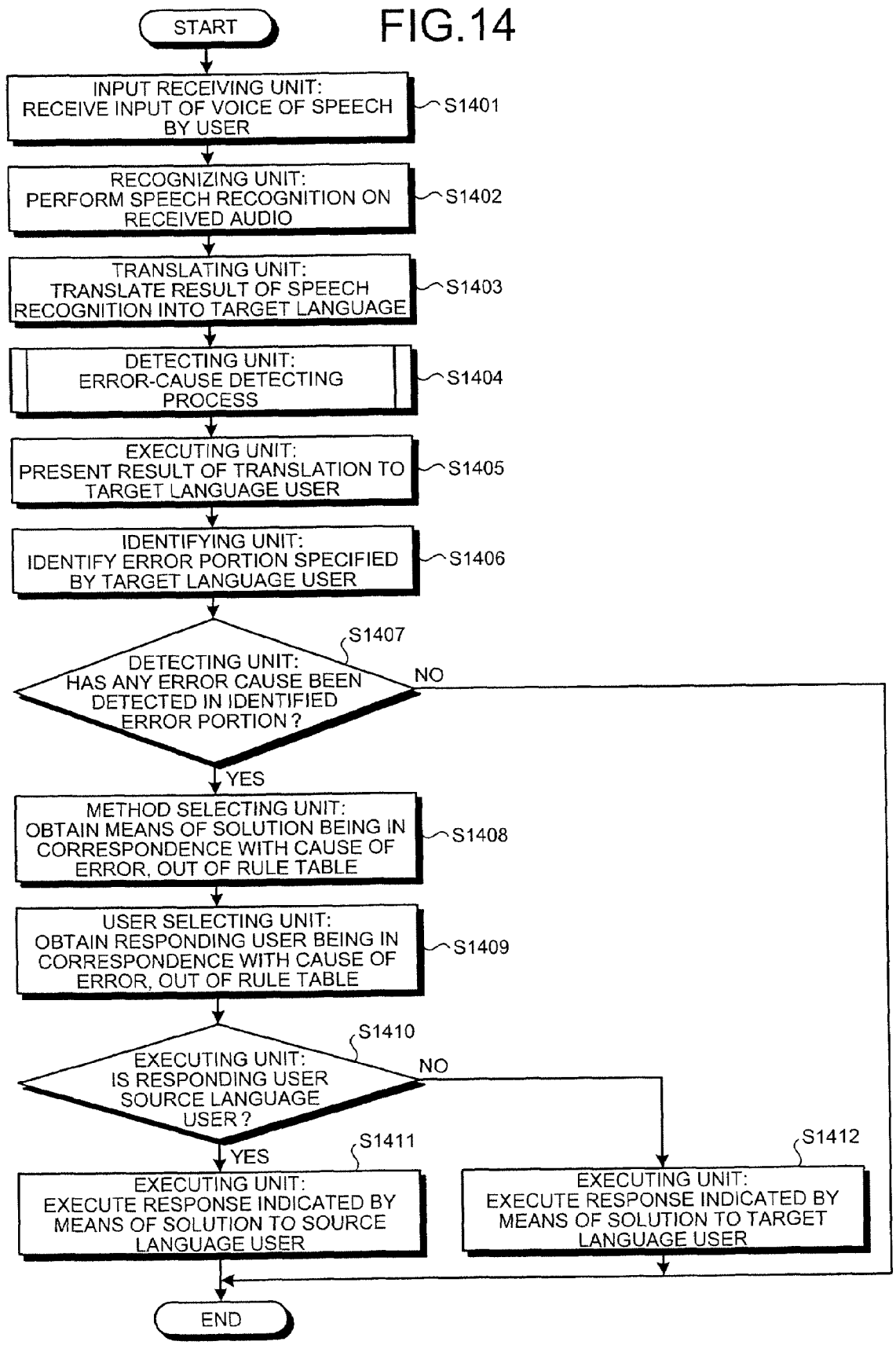
FIG. 14 is a flow chart of an overall procedure of a speech processing according to the third embodiment.

Next, the speech processing performed by the speech processing apparatus 1300 according to the third embodiment as configured above will be explained. FIG. 14 is a flow chart of an overall procedure of the speech processing according to the third embodiment.

The speech input processing, the speech recognition processing, and the error cause detection processing at steps S1401 through S1404 are the same as the processing at steps S1001 through S1004 performed by the speech processing apparatus 900 according to the second embodiment. Thus, the explanation thereof will be omitted.

After the error cause detection processing is performed, the executing unit 906 presents a translation result to the target language user (step S1405). Next, the identifying unit 1308 identifies an error portion that has been specified by the target language user (step S1406). To be more specific, the identifying unit 1308 identifies, as the error portion, the portion that has been specified by the target language user as a portion that was not understood, using an input device such as an operation button, out of the translation result being displayed on the screen.

Subsequently, the detecting unit 1303 judges whether any cause of error has been detected in the error portion identified by the identifying unit 1308 (step S1407). When one or more causes of error have been detected in the error portion identified by the identifying unit 1308 (step S1407: Yes), the processing at steps S1408 through S1412 will be performed.

The method selection processing, the responding user selection processing, and the response execution processing at steps S1408 through S1412 are the same as the processing at steps S1006 through S1010 performed by the speech processing apparatus 900 according to the second embodiment. Thus, the explanation thereof will be omitted.

When no cause of error has been detected in the error portion identified by the identifying unit 1308 (step S1407: No), the speech processing is ended. According to the third embodiment, because the translation result has already been presented at step S1405, it is not necessary to output the translation result, unlike at step S1011 according to second embodiment.

As explained so far, the third embodiment is different from the second embodiment in that the response is executed only for the cause of error that is in correspondence with the error portion specified by the user. With this arrangement, it is possible to correct only the minimum necessary portion.

Next, a specific example of the speech processing performed by the speech processing apparatus 1300 according to the third embodiment configured as above will be explained.

In the following explanation, an example will be used in which the source language user is an English native speaker who is a local resident in the travel destination of a Japanese tourist and who is not familiar with the operation of the apparatus, whereas the target language user is the Japanese tourist who is the owner of the apparatus. In the example, the local resident responds to previous speech uttered by the Japanese tourist asking the local resident about the location of a hotel in the travel destination.

Firstly, at step S1401, an input of a sentence in English that has been spoken by the source language user and means "Since the hotel is quite far from here, I recommend a taxi." is received. Subsequently, at steps S1402 and S1403, the recognizing unit 102 and the translating unit 907 convert the contents of the voice in the source language into the target language.

Next, at step S1404, the detecting unit 1303 checks to see if there is any error in the speech recognition process by measuring the rate of speech, the sound volume of the voice, and the noise.

In this situation, it is assumed that the word "taxi" has mistakenly been recognized as "tax", because the rate of speech got higher in the latter half of the voice. In this case, the translation result is presented to the Japanese tourist, who is a target language user (step S1405).

Figure 15:
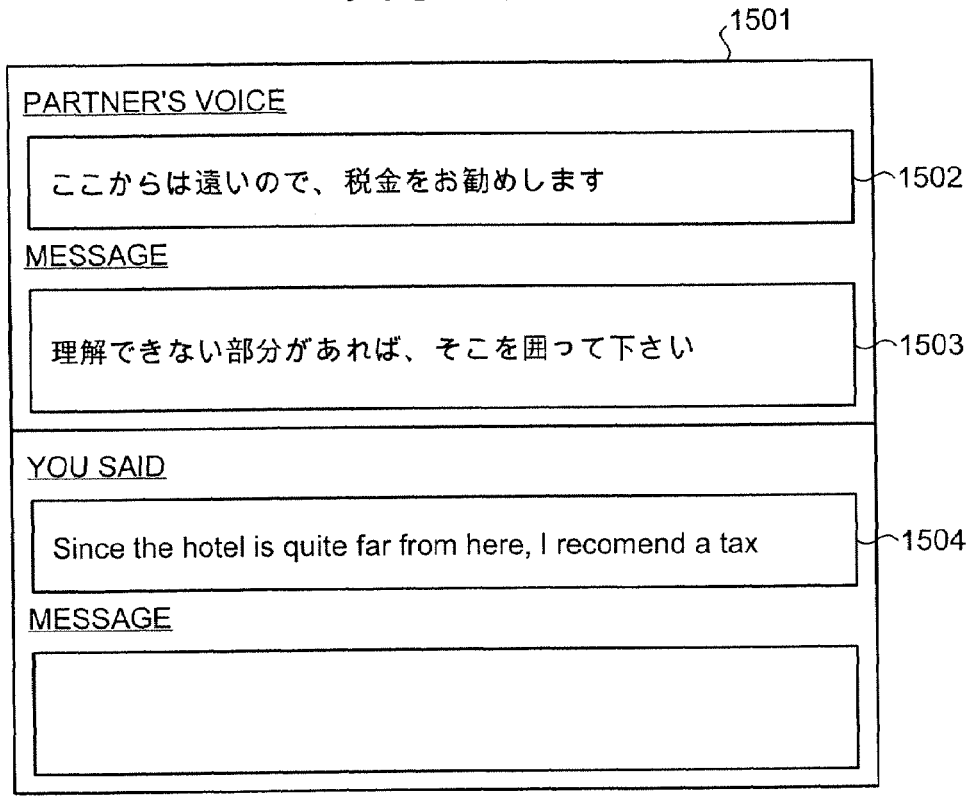
FIG. 15 is a drawing for explaining an example of a display screen on which a translation result is output.

FIG. 15 is a drawing for explaining an example of a display screen on which the translation result has been output. As shown in the drawing, on the display screen 1501, a display field 1502 for displaying a translation result, a display field 1503 for displaying a message to the Japanese tourist, and a display field for displaying a speech recognition result performed on the voice uttered by the local resident are displayed.

In the drawing, an example is shown in which a speech recognition process has been performed with a mistake on the input speech, and "Since the hotel is quite far from here, I recommend a tax." is displayed as the speech recognition result. In addition, a sentence in Japanese obtained by translating the speech recognition result is displayed in the display field 1502. Further, on the screen, a message in Japanese that requests an error portion should be specified and that means "If there is any portion that is not understandable, please circle the portion." is displayed in the display field 1503.

Figure 16:
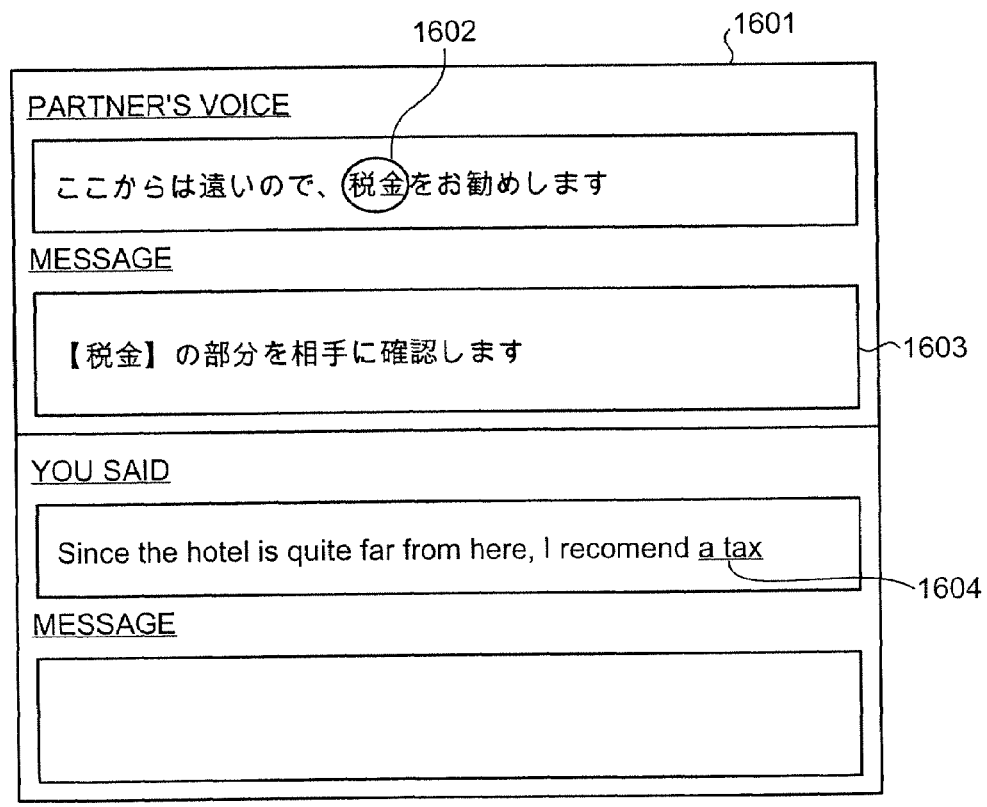
FIG. 16 is a drawing for explaining an example of a display screen after an error portion is specified.

FIG. 16 is a drawing for explaining an example of a display screen after an error portion is specified. On the display screen 1601 shown in the drawing, an example in which a sentence in Japanese that has been translated incorrectly because the word "taxi" is recognized as "tax" by mistake is shown, and the portion 1602 indicating the Japanese word for "tax" has been specified by the Japanese tourist as a portion that is not understandable. In the display field 1603, a Japanese sentence that means "The partner will be asked to check the portion with the word 'tax'" is displayed. Further, a portion of the speech recognition result in English (i.e. "a tax") that corresponds to the specified error portion is underlined as shown with the reference numeral 1604. It is illustrated that the portion of the speech recognition result that corresponds to the error portion is identified.

Subsequently, the detecting unit 1303 judges whether any cause of error has been detected in the portion of "a tax", which is the identified error portion (step S1407). As an example, it is assumed that it has been detected that the rate of speech at the last portion of the speech was high.

In such a situation, for example, a response example to ask the speaker to speak more slowly is obtained from the rule table 131. Although it is not shown in FIG. 2, the rule table 131 stores therein response messages in both the source language and the target language, and the selection of the message is switched according to the responding user.

Figure 17:
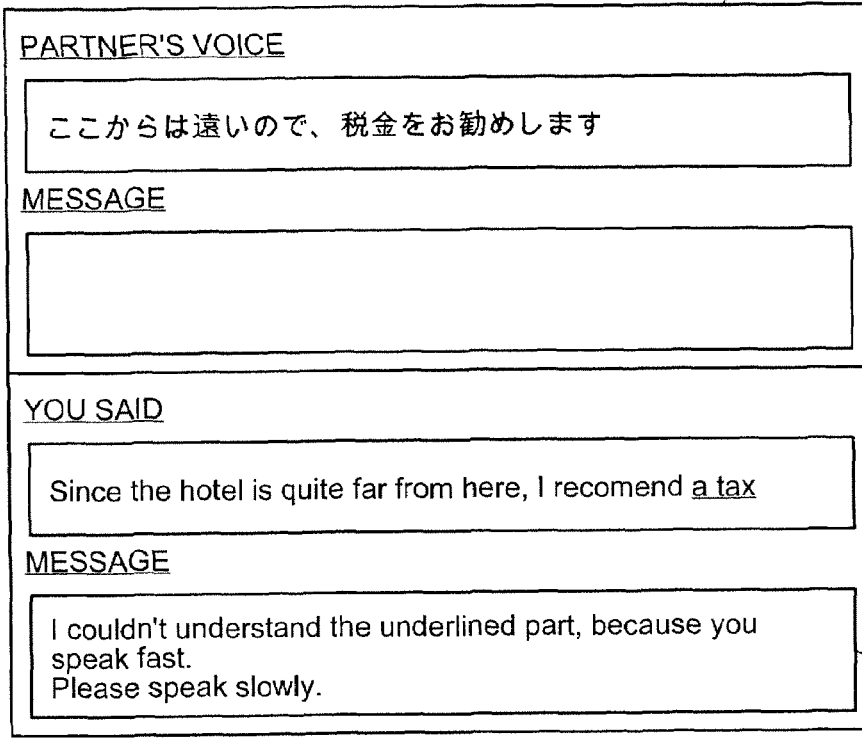
FIG. 17 is a drawing for explaining an example of a display screen on which a response message is displayed.

FIG. 17 is a drawing for explaining an example of a display screen on which a response message is displayed. On the display screen 1701 shown in the drawing, an example is shown in which, in correspondence with the fact that the rate of speech at the last portion of the speech has been detected to be high, a response example to request that the speaker should speak more slowly is displayed in the display field 1702.

Figure 18:
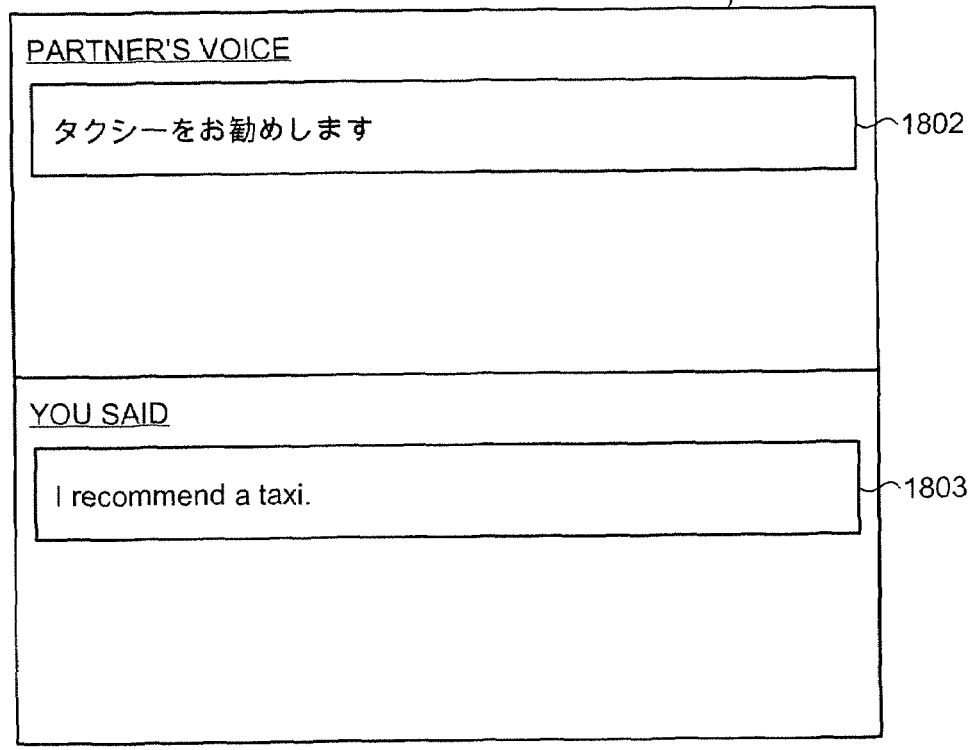
FIG. 18 is a drawing for explaining an example of a display screen after a source language user has repeated the voice.

FIG. 18 is a drawing for explaining an example of a display screen after the source language user has made a voice again, in correspondence with the response. On the display screen 1801 shown in the drawing, an example is shown in which the speech recognition result of only the portion that has been spoken again is displayed in the display field 1803, and a translation result obtained by translating the speech recognition result is displayed in the display field 1802.

In the examples above, a situation in which there is a problem in the manner of speaking of the source language user has been explained. As another example, in a situation where speech was not recognized correctly because there is constant noise in the background, the responding user will be the target language user who is the owner of the apparatus, according to the rule table 131 shown in FIG. 2. Consequently, a response will be presented to the target language user (step S1412).

Figure 19:
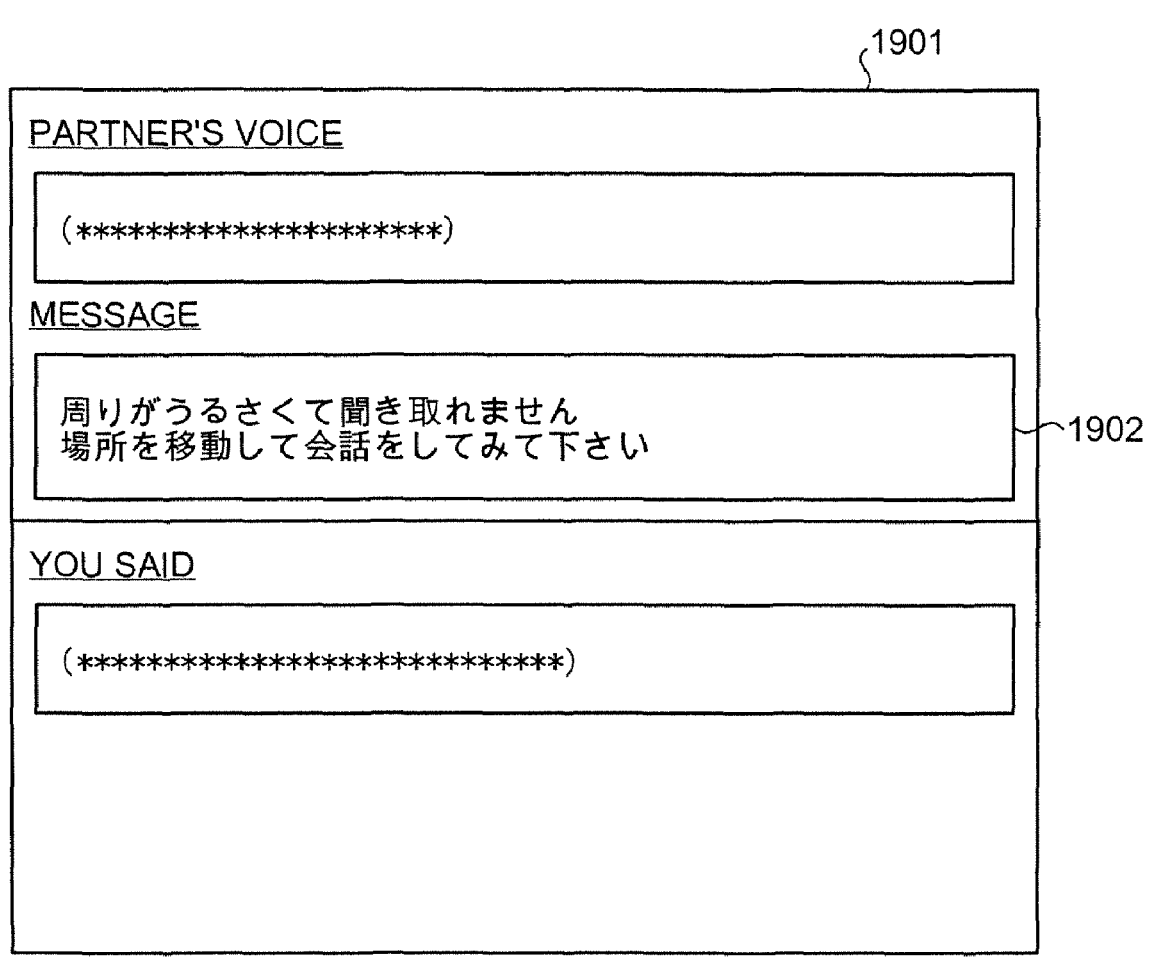
FIG. 19 is a drawing for explaining an example of a display screen on which feedback to a target language user is displayed.

FIG. 19 is a drawing for explaining an example of a display screen on which feedback to a target language user is displayed. On the display screen 1901 shown in the drawing, an example is shown in which a response example to be used when background noise is overlapping the entire speech is displayed in the display field 1902.

In the description above, the example in which the cause of error has been detected in the section pointed out by the identifying unit 1308 is explained; however, having another arrangement is also acceptable so that, when no cause of error has been detected in the section that has been pointed out, it is judged that there is a cause of error that is beyond the scope of assumptions in the third embodiment, and a general response such as "Please speak once again" may be returned to the speaker.

As explained so far, when the speech processing apparatus according to the third embodiment is used, the conversation partner points out a portion that has an error out of a presented result of speech recognition, and it is possible to detect an acoustic cause of error in the speech within the range that has been pointed out. Thus, it is possible to improve the level of precision in the detection of causes of errors. In addition, it is possible to continue a conversation smoothly because only the minimum necessary portion has to be corrected.

A speech processing apparatus according to a fourth embodiment stores therein a history of causes of errors that have been detected and switches the responding method to be used when an error has occurred, by referring to the history of causes of errors that is stored.

Figure 20:
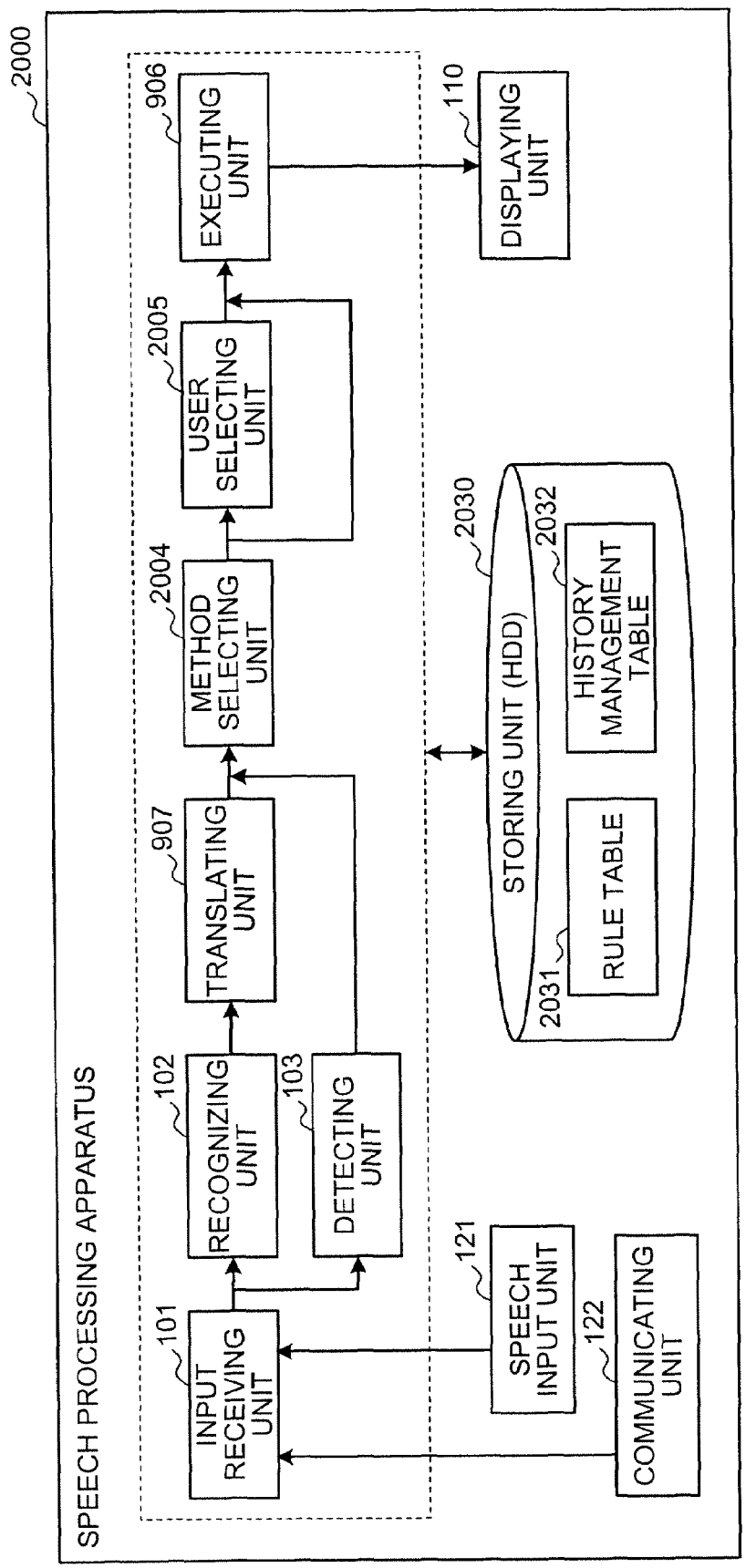
FIG. 20 is a block diagram of a speech processing apparatus according to a fourth embodiment.

FIG. 20 is a block diagram of the speech processing apparatus according to the fourth embodiment. As shown in the drawing, the speech processing apparatus 2000 includes the input receiving unit 101, the recognizing unit 102, the detecting unit 103, a method selecting unit 2004, a user selecting unit 2005, the executing unit 906, the translating unit 907, the displaying unit 110, the speech input unit 121, the communicating unit 122, and a storing unit 2030.

The fourth embodiment is different from the second embodiment in that the method selecting unit 2004 and the user selecting unit 2005 have functions that are different from those described in the second embodiment. Also, the fourth embodiment is different from the second embodiment in that a history management table 2032 is additionally included in the storing unit 2030, and also the rule table 2031 has a data structure that is different from the one described in the second embodiment. Other configurations and functions are the same as those shown in FIG. 9, which is a block diagram of the speech processing apparatus 900 according to the second embodiment. Thus, the same reference characters are used to refer to those elements in common, and the explanation thereof will be omitted.

The history management table 2032 stores therein a history of causes of errors that have been detected in the past. FIG. 21 is a drawing for explaining an example of the data structure of the history management table 2032.

As shown in the drawing, the history management table 2032 stores therein, in correspondence with one another, the "time of occurrence" that is information used to identify a point in time when a voice is made, the "speaker", and "detected cause of error". In the drawing, an example is shown in which a history indicating that background noise overlapping the immediately preceding voice made by an English speaker has been detected as a cause of error is stored.

The rule table 2031 is different from the one according to the second embodiment in that the rule table 2031 stores therein a rule that further shows, in correspondence with other conditions, predetermined conditions that are related to the history of the causes of errors.

FIG. 22 is a drawing for explaining an example of the data structure of the rule table 2031. As shown in the drawing, the rule table 2031 stores therein, in correspondence with one another, types of causes, causes of errors to be detected, history conditions, responding users, and response examples.

As for the "history conditions", predetermined conditions that are related to the history of causes of errors are specified. Examples of specified history conditions include: whether background noise was overlapping the speech even in an immediately preceding voice or no background noise was overlapping the speech in the immediately preceding voice. It is acceptable to omit the procedure to specify the history conditions if there is no need to perform the procedure.

The method selecting unit 2004 is different from the method selecting unit 104 according to the second embodiment in that the method selecting unit 2004 determines a means of solution so that it matches not only the detected cause of error, but also the conditions that are satisfied in the history of the causes of errors, by referring to the history management table 2032.

The user selecting unit 2005 is different from the user selecting unit 105 according to the second embodiment in that the user selecting unit 2005 selects a responding user that matches not only the detected cause of error but also the conditions that are satisfied in the history of the causes of errors, by referring to the history management table 2032.

Next, the speech processing performed by the speech processing apparatus 2000 according to the fourth embodiment configured as above will be explained. FIG. 23 is a flow chart of an overall procedure in the speech processing according to the fourth embodiment.

The speech input processing, the speech recognition processing, and the error cause detection processing at steps S2301 through S2305 are the same as the processing at steps S1001 through S1005 performed by the speech processing apparatus 900 according to the second embodiment. Thus, the explanation thereof will be omitted.

At step S2305, when it is judged that one or more causes of error have been detected (step S2305: Yes), the method selecting unit 2004 refers to the history management table 2032 and obtain a means of solution that is in correspondence with the cause of error and history conditions, out of the rule table 2031 (step S2306).

For example, it is assumed that, for a result of speech recognition performed on current voice, it has been detected that background noise is overlapping the speech, and also the history management table 2032 stores therein a history of causes of errors as shown in FIG. 21. In this situation, the obtained history condition indicates that background noise was overlapping the speech even in the immediately preceding voice. Thus, a response example to request that the speaker changes the location is obtained as a means of solution, out of the rule table 2031 as shown in FIG. 22.

Next, the user selecting unit 2005 refers to the history management table 2032 and obtains a responding user that is in correspondence with the cause of error and the history conditions, out of the rule table 2031 (step S2307). In the example mentioned above, the owner of the apparatus is obtained as the responding user, out of the rule table 2031 as shown in FIG. 22.

The response execution processing at steps S2308 through S2311 is the same as the processing at steps S1008 through S1011 performed by the speech processing apparatus 900 according to the second embodiment. Thus, the explanation thereof will be omitted.

As explained so far, the fourth embodiment is different from the second embodiment in that, according to the fourth embodiment, the history of the causes of errors is stored so that the contents of a response and the responding user are switched with reference to the history. With this arrangement, it is possible to change the contents of a response when the same error cause is detected repeatedly.

Next, a specific example of the speech processing performed by the speech processing apparatus 2000 according to the fourth embodiment will be explained.

In the following explanation, an example will be used in which the source language user is an English native speaker who is a local resident in the travel destination of a Japanese tourist and who is not familiar with the operation of the apparatus, whereas the target language user is the Japanese tourist who is the owner of the apparatus. In the example, the local resident responds to previous voice uttered by the Japanese tourist asking the local resident about the location of a hotel in the travel destination.

Firstly, at step S2301, an input of a sentence in English that has been spoken by the source language user and means "Since the hotel is quite far from here, I recommend a taxi." is received. Subsequently, at steps S2302 and S2303, the recognizing unit 102 and the translating unit 907 convert the contents of the voice in the source language into the target language.

Next, at step S2304, the detecting unit 103 checks to see if there is any error in the speech recognition process by measuring the rate of speech, the sound volume of the voice, and the noise.

In this situation, it is assumed that background noise was detected in the immediately preceding voice as shown in FIG. 21, and also background noise has been detected in the speech that is currently being processed. In this situation, the method selecting unit 2004 selects, as a means of solution, a response example requesting that the location should be changed, out of the rule table 2031 as shown in FIG. 22 (step S2306). Also, the user selecting unit 2005 selects the owner as the responding user, out of the rule table 2031 as shown in FIG. 22 (step S2307).

On the other hand, if background noise is detected for the first time in the speech that is currently being processed, a response requesting that the speaker speak more loudly is selected out of the rule table 2031 as shown in FIG. 22.

As explained so far, when the speech processing apparatus according to the fourth embodiment is used, when the same cause of error is repeatedly detected, it is possible to select a new means of solution to make a breakthrough in the situation. It is possible to avoid the risk of having a conversation end up in failure because of making the same mistake, by returning most appropriate feedback according to the causes of errors that have been detected in the past. In addition, it is possible to reduce unnecessary interactions because the feedback is returned to only the user who is able to address to the problem.

A speech processing apparatus according to a fifth embodiment presents the execution status of a response to the conversation partner, while the response in correspondence with the detected cause of error is being executed.

The configuration of the speech processing apparatus according to the fifth embodiment is the same as the one shown in FIG. 9, which is a block diagram of the speech processing apparatus 900 according to the second embodiment. Thus, the same reference characters are used to refer to those elements in common, and the explanation thereof will be omitted.

The fifth embodiment is different from the second embodiment in that, while the executing unit 106 is executing a response, the contents of the response is displayed to a user other than the responding user so that the current status can be understood.

Figure 24:
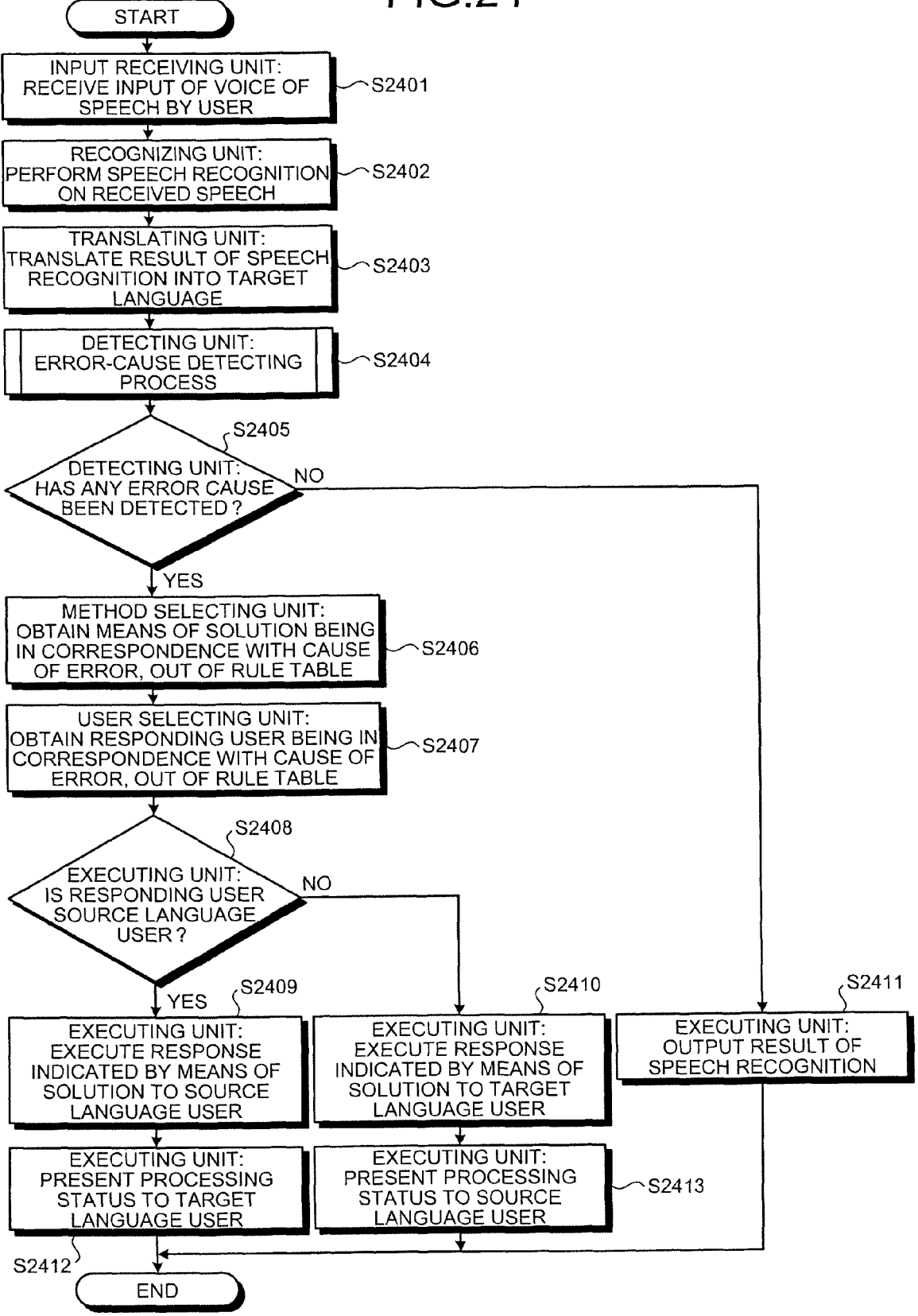
FIG. 24 is a flow chart of an overall procedure in a speech processing according to a fifth embodiment.

Next, the speech processing performed by the speech processing apparatus according to the fifth embodiment configured as above will be explained. FIG. 24 is a flow chart of an overall procedure in the speech processing according to the fifth embodiment.

The speech input processing, the speech recognition processing, the error cause detection processing, the method selection processing, the responding user selection processing, and the response execution processing performed for the responding user at steps S2401 through S2411 are the same as the processing at steps S1001 through S1011 performed by the speech processing apparatus 900 according to the second embodiment. Thus, the explanation thereof will be omitted.

According to the fifth embodiment, after the executing unit 106 executes a response to the source language user at step S2409, or after the executing unit 106 executes a response to the target language user at step S2410, the executing unit 106 presents the processing status to the target language user or the source language user, respectively (step S2412, step S2413).

As explained so far, according to the fifth embodiment, the feedback is returned, not only to the user that solves a problem related to the cause of error, but to both of the users. Thus, it is possible for both of the users to understand the current status of each other.

Next, a specific example of the speech processing performed by the speech processing apparatus according to the fifth embodiment configured as above will be explained.

In the following explanation, an example will be used in which the source language user is an English native speaker who is a local resident in the travel destination of a Japanese tourist and who is not familiar with the operation of the apparatus, whereas the target language user is the Japanese tourist who is the owner of the apparatus. In the example, the local resident responds to previous voice uttered by the Japanese tourist asking the local resident about the location of a hotel in the travel destination.

Firstly, at step S2401, an input of a sentence in English that has been spoken by the source language user and means "Since the hotel is quite far from here, I recommend a taxi." is received. Subsequently, at steps S2402 and S2403, the recognizing unit 102 and the translating unit 907 convert the contents of the voice in the source language into the target language.

Next, at step S2404, the detecting unit 103 checks to see if there is any error in the speech recognition process by measuring the rate of speech, the sound volume of the voice, and the noise.

In this situation, it is assumed that the rate of speech in the entire speech was high, and none of the voice was understood. Then, a rule out of the rule table 131 as shown in FIG. 2 is applied so that a response requesting that the speaker should speak more slowly is returned to the speaker (step S2406, step S2407).

In this situation, the executing unit 106 displays a message of the response to the source language user (step S2409), and also displays, to the target language user, a status of the response that is being executed to the source language user (step S2412).

Figure 25:
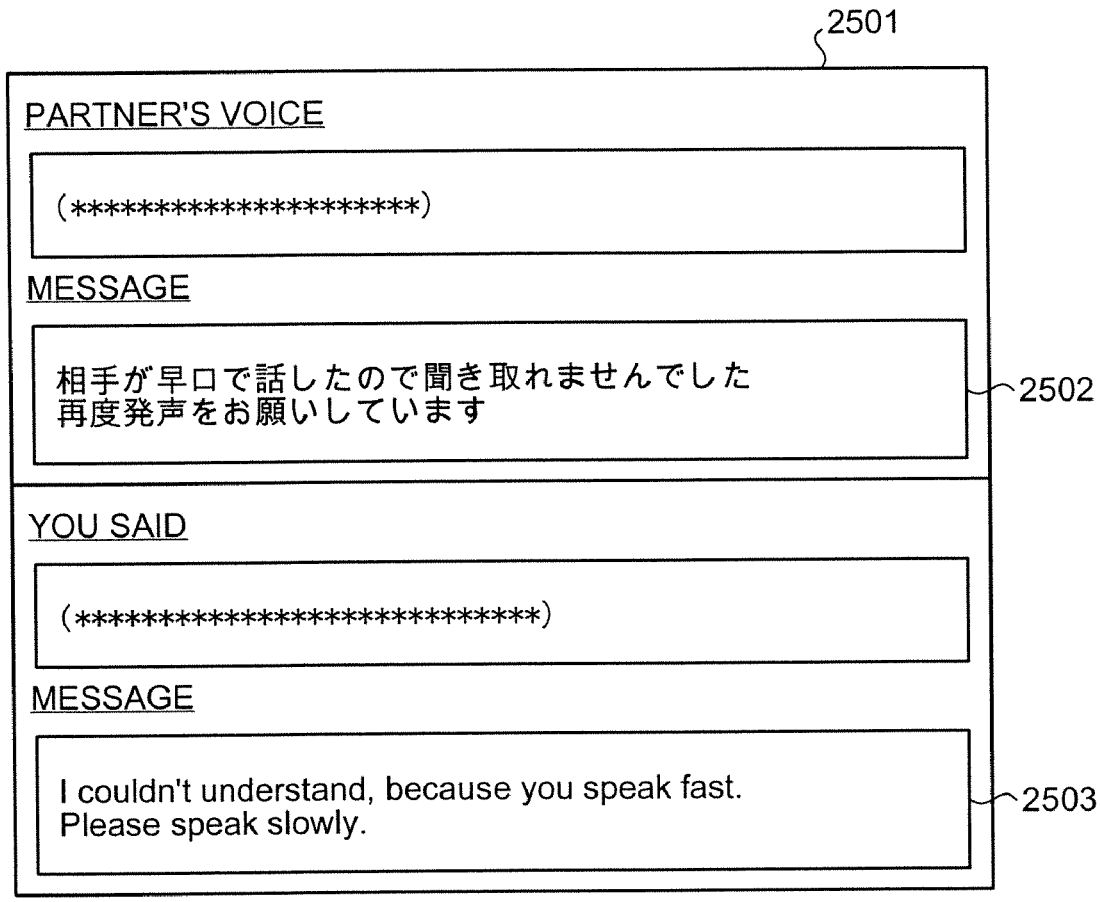
FIG. 25 is a drawing for explaining an example of a display screen on which a status of a processing of a response is displayed.

FIG. 25 is a drawing for explaining an example of a display screen on which a status of the processing of the response is displayed. On the display screen 2501 in the drawing, an example is shown in which a response is displayed in the display field 2503, and also a message in Japanese indicating the status of the processing of the response is displayed in the display field 2502.

In the explanation above, the example is used in which the messages to the source language user and the target language user are displayed at the same time; however, having another arrangement is also acceptable so that synthesized sound obtained by performing speech synthesis on the message is presented to the source language user, whereas a message is conveyed to the target language user on the display screen. The method for presenting the messages is not limited to these examples. To present messages, it is possible to use any of various methods that have conventionally been used; for example, to output synthesized sound generated in the respective language in the direction toward the source language user and the target language user.

As explained so far, when the speech processing apparatus according to the fifth embodiment is used, while a response being in correspondence with a detected cause of error is being executed, it is possible to present the execution status of the response to the conversation partner. Thus, the conversation partner is able to understand that an error has occurred, and also understand the contents of operations performed by the speaker or the owner of the apparatus. Consequently, it is possible to prevent confusion caused by the blank in a conversation, and to continue the conversation smoothly.

Figure 26:
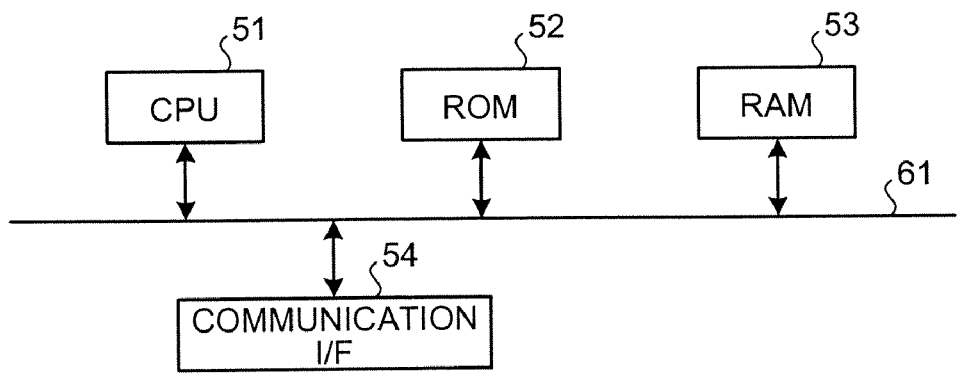
FIG. 26 is a drawing for explaining a hardware configuration of the speech processing apparatuses according to the first to the fifth embodiments.

FIG. 26 is a drawing for explaining a hardware configuration of the speech processing apparatuses according to the first to the fifth embodiments.

The speech processing apparatuses according to the first to the fifth embodiments each include a control device like a Central Processing Unit (CPU) 51, storage devices like a Read Only Memory (ROM) 52 and a Random Access Memory (RAM) 52, a communication interface (I/F) 54 that connects to a network and performs communication, and a bus 61 that connects the constituent elements with one another.

A speech processing program that is executed in each of the speech processing apparatuses according to the first to the fifth embodiments is provided as being incorporated into the ROM 52 or the like, in advance.

The speech processing program that is executed in each of the speech processing apparatuses according to the first to the fifth embodiments may be provided as being recorded on a computer-readable recording medium such as a Compact Disk Read Only Memory (CD-ROM), a Flexible Disk (FD), a Compact Disk Recordable (CD-R), or a Digital Versatile Disk (DVD), in a file that is in an installable format or in an executable format.

The speech processing program that is executed in each of the speech processing apparatuses according to the first to the fifth embodiments may be stored in a computer connected to a network like the Internet and provided as being downloaded via the network. The speech processing program that is executed in each of the speech processing apparatuses according to the first to the third embodiments may be provided or distributed via a network like the Internet.

The speech processing program that is executed in each of the speech processing apparatuses according to the first to the fifth embodiments is structured as a module that includes the constituent elements that are described above (i.e. the input receiving unit, the recognizing unit, the detecting unit, the method selecting unit, the user selecting unit, the executing unit, the translating unit, and the identifying unit). In the actual hardware configuration, the constituent elements are loaded onto a main storage device and generated in the main storage device, when the CPU 51 reads and executes the speech processing program from the ROM 52.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech processing apparatus comprising:
   a rule storing unit that stores therein a rule that correlates causes of errors in speech recognition, responding methods each of which is used when an error has occurred during the speech recognition, and responding users each of whom is one of a first user and a second user, the first user being a user that inputs a speech and the second user being a user that does not input a speech;
   an input receiving unit that receives an input of a speech;
   a recognizing unit that recognizes the received speech;
   a detecting unit that detects a cause of an error that has occurred during the recognition of the speech;
   a method selecting unit that selects one of the responding methods that is correlated with the detected cause of the error from the rule storing unit;
   a user selecting unit that selects one of the responding users that is correlated with the detected cause of the error from the rule storing unit; and
   an executing unit that executes the response to the selected responding user by the selected responding method.

2. The apparatus according to claim 1, further comprising:
   an error portion receiving unit that receives an error portion having the error within a result of the speech recognition, the error portion being specified by a user,
   wherein the detecting unit detects the cause of the error that has occurred during the speech recognition from the error portion.

3. The apparatus according to claim 1, further comprising:
   a history storing unit that stores therein a history of the detected cause of the error; and
   an obtaining unit that obtains the history from the history storing unit when the cause of the error has been detected, wherein
   the rule storing unit stores therein the rule that correlates one another predetermined conditions related to the history, the causes of the errors, the responding methods, and the responding users,
   the obtaining unit obtains one of the predetermined conditions related to the obtained history,
   the method selecting unit selects one of the responding methods that is correlated with the obtained condition and the detected cause of the error from the rule storing unit, and
   the user selecting unit selects one of the responding users that is correlated with the obtained condition and the detected cause of the error from the rule storing unit.

4. The apparatus according to claim 3, wherein the rule storing unit stores therein the rule that is correlated with the predetermined conditions each of which indicates a relationship between a cause of an error that has occurred during the recognition of the speech that is input prior to the speech serving as a target of the error detection and the cause of the error that has occurred during the recognition of the speech serving as the target of the error detection.

5. The apparatus according to claim 1, further comprising:
   a translating unit that translates a result of the recognition of the speech in a first language into a second language,
   wherein the first user is a user that has input the speech in the first language and the second user is a user that receives a result of the translation in the second language.

6. The apparatus according to claim 1, wherein the executing unit executes the response to the selected responding user and presents information related to the response to the other users that have not been selected.

7. The apparatus according to claim 1, wherein the detecting unit detects at least a rate of the speech as the cause of the error.

8. The apparatus according to claim 1, wherein the detecting unit detects at least a volume of voice of the speech as the cause of the error.

9. The apparatus according to claim 1, wherein the detecting unit detects at least noise included in the speech as the cause of the error.

10. The apparatus according to claim 9, wherein the detecting unit detects constant noise that lasts for at least a predetermined first period of time as the noise.

11. The apparatus according to claim 10, wherein the detecting unit detects, as the noise, the constant noise and sudden noise that occurs within a predetermined second period of time that is shorter than the first period of time.

12. The apparatus according to claim 1, wherein
    the rule storing unit stores therein the rule that correlates one another the causes of the errors each of which is one of a cause of an error that has occurred in an entirety of the speech and a cause of an error that has occurred in a portion of the speech, the responding methods, and the responding users, and
    the detecting unit detects the cause of the error that has occurred in one of the entirety of the speech and the portion of the speech.

13. The apparatus according to claim 12, further comprising:
    a displaying unit that displays a result of the recognition of the speech,
    wherein when the detecting unit has detected the cause of the error that has occurred in the portion of the speech, the executing unit brings information indicating that the cause of the error has been detected into association with a portion of the result of the recognition that corresponds to the portion of the speech in which the error has been detected, and outputs the associated result to the displaying unit.

14. The apparatus according to claim 1, further comprising:
    a speech input unit that inputs the speech,
    wherein the input receiving unit receives the input of the speech from the speech input unit.

15. The apparatus according to claim 1, further comprising:
    a communicating unit that transmits and receives information to and from an external apparatus,
    wherein the input receiving unit receives the input of the speech transmitted from the external apparatus via the communicating unit.

16. A speech processing method, carried out via a speech processing apparatus, comprising:
    receiving an input of speech;
    recognizing the received speech; detecting a cause of an error that has occurred during the recognition of the speech;

selecting, via a selecting unit, one of responding methods that is correlated with the detected cause of the error from a rule storing unit that stores therein a rule, wherein the rule correlates causes of errors in speech recognition, responding methods each of which is used when an error has occurred during the speech recognition, and responding users each of whom is one of a first user and a second user, the first user being a user that inputs the received speech and the second user being a user that does not input the received speech;

selecting one of the responding users that is correlated with the detected cause of the error from the rule storing unit; and executing the response to the selected responding user by the selected responding method.

17. A computer program product having a non-transitory computer readable medium including programmed instructions for processing speech, wherein the instructions, when executed by a computer, cause the computer to perform a method comprising:

receiving an input of speech;

recognizing the received speech;

detecting a cause of an error that has occurred during the recognition of the speech;

selecting one of responding methods that is correlated with the detected cause of the error from a rule storing unit that stores therein a rule, wherein the rule correlates causes of errors in speech recognition, responding methods each of which is used when an error has occurred during the speech recognition, and responding users each of whom is one of a first user and a second user, the first user being a user that inputs the received speech and the second user being a user that does not input the received speech;

selecting one of the responding users that is correlated with the detected cause of the error from the rule storing unit; and executing the response to the selected responding user by the selected responding method.

* * * * *